(12) United States Patent
Gilbert

(10) Patent No.: US 11,878,443 B2
(45) Date of Patent: Jan. 23, 2024

(54) SLURRY PROCESSING APPARATUS AND RELATED METHODS

(71) Applicant: NILO LIMITED, Auckland (NZ)

(72) Inventor: Ronald James Gilbert, Auckland (NZ)

(73) Assignee: NILO LIMITED

( * ) Notice: Subject to any disclaimer, the term of this patent is extended or adjusted under 35 U.S.C. 154(b) by 0 days.

(21) Appl. No.: 17/420,373

(22) PCT Filed: Jun. 10, 2021

(86) PCT No.: PCT/IB2021/055132
§ 371 (c)(1),
(2) Date: Jul. 1, 2021

(87) PCT Pub. No.: WO2021/250619
PCT Pub. Date: Dec. 16, 2021

(65) Prior Publication Data
US 2023/0094512 A1 Mar. 30, 2023

(30) Foreign Application Priority Data

Jun. 10, 2020 (AU) ................................ 2020901913
Jun. 11, 2020 (AU) ................................ 2020901934

(51) Int. Cl.
*B02C 18/00* (2006.01)
*B29B 17/04* (2006.01)
*B02C 18/14* (2006.01)
*B02C 23/36* (2006.01)

(52) U.S. Cl.
CPC ...... *B29B 17/0404* (2013.01); *B02C 18/0092* (2013.01); *B02C 18/145* (2013.01); *B02C 23/36* (2013.01); *B29B 2017/0492* (2013.01)

(58) Field of Classification Search
CPC ... B02C 23/36; B02C 18/0092; B02C 18/062; B02C 19/0093
See application file for complete search history.

(56) References Cited

U.S. PATENT DOCUMENTS 3,738,581 A * 6/1973 Gallauresi ........... B02C 18/0092
241/46.11
3,989,196 A * 11/1976 Urschel ................. B02C 18/062
241/27
4,275,849 A * 6/1981 Chambers ........... B02C 18/0092
241/46.06

(Continued)

*Primary Examiner* — Faye Francis
(74) *Attorney, Agent, or Firm* — Dentons Durham Jones Pinegar; Sarah W. Matthews

(57) ABSTRACT

A macerator includes a housing that defines a chamber, an inlet and an outlet, the inlet to receive a flow of slurry; two or more elongate concentric bodies located within the chamber defining a gap between the surface of the outer body and the inner surface of the housing, at least one of the bodies rotatable about an axis, and each body comprising a plurality of apertures defining a flow path through each body; a baffle(s) that extend substantially the width of the gap to define a first portion containing the inlet, and a second portion containing the outlet, baffle(s) substantially inhibiting passage of slurry between the two portions via the gap such that the slurry is directed through the body apertures; a motor to drive the rotating body(ies); one or more injectors that inject liquid into the gap, at least one injector located in the first portion.

20 Claims, 12 Drawing Sheets

(56) References Cited

U.S. PATENT DOCUMENTS

| | | | | |
|---|---|---|---|---|
| 4,570,863 A * | 2/1986 | Knox, Jr. | ............... | B02C 9/00 |
| | | | | 241/46.06 |
| 4,813,617 A * | 3/1989 | Knox, Jr. | ............... | B02C 23/36 |
| | | | | 241/46.06 |
| 5,451,004 A * | 9/1995 | Altonji | ............... | B02C 18/0092 |
| | | | | 209/234 |
| 7,284,716 B2 * | 10/2007 | Nakano | ............... | B01F 27/50 |
| | | | | 241/74 |
| 11,338,476 B2 * | 5/2022 | Hodgson | ............ | B02C 18/0084 |
| 11,440,020 B2 * | 9/2022 | Quinn | ............... | B02C 23/36 |
| 2015/0219098 A1 * | 8/2015 | Mehta | ............... | B02C 23/36 |
| | | | | 137/1 |
| 2017/0259443 A1 * | 9/2017 | Binks | ............... | B02C 19/0025 |

\* cited by examiner

SLURRY PROCESSING APPARATUS AND RELATED METHODS

CROSS-REFERENCE TO RELATED APPLICATION

A claim for priority to the Jun. 10, 2021 filing date of International Application No. PCT/IB2021/055132 ('132 PCT Application), titled SLURRY PROCESSING APPARATUS AND RELATED METHODS, which claims priority to AU Patent Application No. 2020901913 ('913 Application), filed Jun. 10, 2020 and AU Patent Application No. 2020901934 ('934 Application), filed Jun. 11, 2020. The entire disclosures of the '132 PCT Application, '913 Application and '934 Application are hereby incorporated by reference herein.

FIELD OF THE INVENTION

The present invention relates to an apparatus for, and a method of, processing an input material such as plastic. In particular, the present invention relates to the use of a macerator to reduce the particle size of the input material, such as plastic.

BACKGROUND TO THE INVENTION

Plastic is a widely used material in both household and industrial items. Many countries are struggling to dispose or utilize the waste plastic in an economical and safe manner. The recycling of plastic into other goods is known, but requires energy and resources to wash the plastic, reduce it to a desired particle size from its original form and then re-utilize it in a recycled product.

It is an object of the present invention to provide a method of reducing the particulate size of the substrate, such as plastic, or to at least provide the public with a useful choice.

SUMMARY OF THE INVENTION

In a first aspect there is described a macerator for processing a slurry, the macerator comprising:
  a housing that defines a chamber an inlet and an outlet, the inlet configured to receive a flow of slurry,
  two or more elongate concentric bodies located within the chamber to define a gap between the surface of the outer body and the inner surface of the housing, the bodies having a first end and a second end, at least one of the bodies rotatable about an axis, and each body comprising a plurality of apertures to define a flow path through each body, from the housing inlet to the housing outlet,
  a baffle or baffles that extend substantially the width of the gap from the first end to the second end of the bodies to define a first portion that contains the inlet, and a second portion that contains the outlet, and wherein the baffle or baffles substantially inhibit passage of slurry between the two portions via the gap such that the slurry is directed through the body apertures,
  a motor to drive the rotating body or bodies,
  one or more injectors that inject liquid into the gap, wherein at least one of the injectors is located in the first portion.

In a further aspect there is described a process for producing an emulsion comprising
  a) introducing a slurry into a macerator inlet, the macerator comprising:
  a housing that defines a chamber an inlet and an outlet, the inlet configured to receive a flow of slurry,
  two or more elongate concentric bodies located within the chamber to define a gap between the surface of the outer body and the inner surface of the housing, the bodies having a first end and a second end, at least one of the bodies rotatable about an axis, and each body comprising a plurality of apertures to define a flow path through each body, from the housing inlet to the housing outlet,
  a baffle or baffles that extend substantially the width of the gap from the first end to the second end of the bodies to define a first portion that contains the inlet, and a second portion that contains the outlet, and wherein the baffle or baffles substantially inhibit passage of slurry between the two portions via the gap such that the slurry is directed through the body apertures,
  a motor to drive the rotating body or bodies,
  one or more injectors that inject liquid into the gap, wherein at least one of the injectors is located in the first portion, and
  wherein the particle size of the inlet slurry is greater than the particle size of the outlet slurry,
  b) operating the motor to drive one or more of the bodies such that the slurry transverses the apertures of the bodies to the outlet, and
  wherein the particle size of the outlet slurry is less than the particle size of the inlet slurry.

In a further aspect there is described the use of the macerator to manufacture a plastic containing binder.

In a further aspect there is described the use of the macerator to manufacture a plastic containing binder for use in manufacturing a roading composition.

In a further aspect there is described the use of the macerator to manufacture a plastic containing binder for the manufacture of a plastic composite product.

In a further aspect the invention relates to a base ingredient as an emulsion, for use in the production of a composite plastic product, the base ingredient comprising
  a first component, being a slurry comprising plastic particles having a mean particle diameter of less than about 0.5 to about 20 mm, the plastic particles in the first component comprising 50 to 80% polyethylene and 20 to 50% of other plastics;
  a second component comprising at least 40% of a paper and a substrate, the substrate selected from wood, rubber, concrete or a combination thereof;
  wherein the first and second components are mixed to produce an emulsion.

In a further aspect the invention relates to a base ingredient as an emulsion, for use in the production of a composite plastic product, the base ingredient comprising
  a first component, being a slurry comprising plastic particles having a mean particle diameter of less than about 0.5 to about 20 mm, the plastic particles in the first component comprising 50 to 80% polyethylene and 20 to 50% of other plastics;
  a second component comprising at least 40% of a paper and a substrate, the substrate selected from wood, rubber, concrete or a combination thereof;
  wherein the first and second components are mixed to produce an emulsion Any one or more of the following embodiments may relate to any of the aspects described herein or any combination thereof.

In one configuration the particle size of the plastic particles in the slurry are less than 20 mm.

In one configuration the slurry is injected into the chamber via a screw.

In one configuration the axis of rotation is substantially horizontal.

In one configuration the baffles extend along a plane that extends along the axis of rotation.

In one configuration the baffles extend along a plane that substantially passes through the rotational axis.

In one configuration the first and second portions substantially define a first and second hemisphere.

In one configuration the first and second hemisphere are substantially equal.

In one configuration the macerator comprises a vacuum pump that applies a vacuum to chamber outlet.

In one configuration the head pressure at the outlet is about 2.5, 3.0, 3.5, 4.0, 4.5, 5.0, 5.5, 6.0, 6.5, 7.0, 7.5, 8.0, 8.5, 9.0, 9.5 or 10 psi, and suitable ranges may be selected from between any of these values.

In one configuration the one or more injectors assist or direct the flow of slurry through the apertures.

In one configuration the one or more injectors inject liquid proximal to the baffle.

In one configuration the macerator comprises a plurality of injectors that inject water into the gap proximal and distally to the baffle.

In one configuration injectors inject liquid into the gap in the second portion.

In one configuration the pressure of the liquid injected from the injectors proximal to the baffle is greater than the pressure of liquid injected by the injectors located distally to the baffle.

In one configuration the injector is a pump that comprises a conduit and outlet to the conduit that vents into the gap.

In one configuration the housing comprises an outer casing and an inner casing to define an intermediate space.

In one configuration the inner casing comprises a plurality of apertures.

In one configuration the inner casing comprises a plurality of slots.

In one configuration the outlet of the pump injects liquid into the aperture or slot.

In one configuration the outlet conduit spans the outer casing.

In one configuration the inner casing is or comprises wedge wire.

In one configuration the injector injects liquid into the intermediate space.

In one configuration the intermediate space is isolated from the gap space so that plastic containing slurry is not able to access the intermediate space.

In one configuration the aperture or slot size is smaller than the plastic particle size.

In one configuration the pressure in the intermediate space is at least 2.5, 3. 3.5, 4.0, 4.5, 5.0, 5.5, 6.0, 6.5, 7.0, 7.5 or 8 times the pressure of the slurry in the gap, and suitable ranges may be selected from between any of these values.

In one configuration the temperature of the slurry is less than about 30, 25, 20, 15, or 10° C., and suitable ranges may be selected from between any of these values.

In one configuration the injected liquid is chilled.

In one embodiment the pressure in the chamber is about 3, 4, 5, 6, 7, 8, 9, 10, 11, 12, 13, 14 or 15 psi, and suitable ranges may be selected from between any of these values In one configuration the outer body is static.

In one configuration the inner body is static.

In one configuration two or more bodies rotate, where their direction of rotation is opposite to each other.

In one configuration the macerator comprises 2, 3, 4, 5, 6, 7 or 8 bodies, and suitable ranges may be selected from between any of these values.

In one configuration each body rotates a direction opposite to an adjacent body.

In one configuration the housing comprises a shield at the first and second end to enclose the chamber.

In one configuration the process reduces the particle size between the chamber inlet and chamber outlet by at least 40, 45, 50, 55, 60, 65, 70, 75, 80, 85, 90, 95%, and suitable ranges may be selected from between any of these values.

In one configuration the process produces particles having a mean particle size of less than 20, 19, 18, 17, 16, 15, 14, 13, 12, 11, 10, 9, 8, 7, 6, 5, 4, 3, 2 or 1 µm, and suitable ranges may be selected from between any of these values.

In one configuration the slurry comprising particles having a particle size of about 4, 5, 6, 7, 8, 9, 10, 11, 12, 13, 14, 15, 16, 17, 18, 19 or 20 mm, and suitable ranges may be selected from between any of these values.

In one configuration the bodies are separated from each other by less than 0.1, 0.2, 0.3, 0.4, 0.5, 0.6, 0.7, 0.8, 0.9 or 1.0 mm, and suitable ranges may be selected from between any of these values.

In one configuration the outlet is configured to provide a flow of outlet slurry comprising plastic particles having a particle size being less than the particle size of the plastic particles of the inlet slurry.

In one configuration the outlet slurry of the macerator(s) has a plastic particle size being less than a predetermined plastic particle size. More preferably the predetermined particle size is less than 4.0, 3.5, 3.0, 2.5, 2.0, 1.5, 1.0, 0.5, 0.1 mm, and suitable ranges may be selected from between any of these values.

In one configuration the slots or apertures of the macerator(s) comprise one or more slots.

In one configuration the slots or apertures extend a distance between the first and second end of the body.

In one configuration the slots or apertures are angled with respect to a vertical or axial axis of the body.

In one configuration the slots or apertures of a) the inner body or inner sheath and b) the outer body or outer sheath are oriented relative each other non-orthogonally.

In one configuration the slots or apertures are oriented on a common axis.

In one configuration the width of the one or more slots is substantially constant.

In one configuration embodiment the slots vary in width from an outer surface of the body to an inner surface of each of the inner body and outer body.

In one configuration the width of the slot at an outer surface is greater than a width of the slot at an inner surface of each of the inner body and outer body.

In one configuration the width of the slot at an outlet surface of each of the inner body and outer body is greater than a width of the slot at a respective inlet surface of each body.

In one configuration the width of the slot at an inner surface of each inner body and outer body is greater than a width of the slot at an outer surface of each body.

In one configuration the slots of the outer body are wider than the slots of the inner body.

In one configuration the slots of the outer body are about 10, 20, 30, 40, 50, 60, 70, 80, 90, 100, 110, 120, 130, 140, 150, 160, 170, 180, 190, 200, 210, 220, 230, 240, or 250% wider than the slots of the inner body, and suitable ranges may be selected from between any of these values.

In one configuration the slots of the outer body are about 150, 160, 170, 180, 190 or 200% wider than the slots of the inner body, and suitable ranges may be selected from between any of these values.

In one configuration at least one slot of the outer body comprises a projection from the outer surface of the outer body.

In one configuration a body comprises 2, 3, 4, 5 or 6 banks of slots or apertures, each bank of slots or apertures extending the circumference of the body.

In one configuration the projection from the outer surface of the outer body comprises a blade.

In one configuration the projection from the outer surface of the outer body extends in the direction of rotation of the outer body at an acute angle relative to the outer surface of the outer body.

In one configuration the projection extends at an angle of about 5, 10, 15, 20, 25 or 30 degrees, and suitable ranges may be selected from between any of these values.

In one configuration the projection extends at an angle of about 15 degrees.

In one configuration a or the width of the one or more slots is between about 1, 5, 10, 15, 20, 25, 30, 35, 40, 45, 50, 55, 60, 65, 70, 75, 80, 85, 90 mm, and suitable ranges may be selected from between any of these values.

In one configuration the macerator comprises an inner body shaft, the inner body shaft configured to be coupled to one or more inner body to allow for rotation of one or more inner body relative to an axial axis of one or more inner body, optionally one or more inner body shaft being provided with high speed water cooled bearing.

In one configuration the macerator comprises an outer body shaft, the one or more outer body shaft configured to be coupled to the one or more outer body to allow for rotation of the one or more outer body relative to an axial axis of the one or more outer body, optionally the one or more outer body shaft being provided with high speed water cooled bearing.

In one configuration one or more of the inner body shaft and/or the outer body shaft, and coupled to at least one motor, the at least one motor configured to rotate the inner body shaft and/or the outer body shaft.

In one configuration the inner body or the outer body is an inlet body configured to provide for an inlet flow path for the pair of bodies, and wherein the other of the inner body or the outer body is an outlet body configured to provide for an outlet flow path for the pair of bodies.

In one configuration a width or other dimension, or largest dimension of the at least one aperture of the inlet body is greater than a width or other dimension, or largest dimension of the at least one aperture of the outlet body.

In one configuration the flow path from an inlet of the macerator to the outlet of the macerator is through each concentric body.

In one configuration the progression of the slurry through each concentric bodies is configured to progressively decrease a particle size of plastic in the slurry.

In one configuration the rotation of the inner body relative to the outer body applies a shear stress to the plastic particles.

In one configuration the inlet slurry comprises at least one liquid.

In one configuration a macerators system comprises a plurality of macerators.

In one configuration the system comprises 2, 3, 4, 5, 6, 7 or 8 macerators arranged in series, and suitable ranges may be selected from between any of these values.

In one configuration the system comprises 2, 3, 4, 5, 6, 7 or 8 macerators arranged in parallel, and suitable ranges may be selected from between any of these values.

In one configuration the outlet slurry of one of the one or more macerators is configured to be directed to the inlet of another of the one or more macerators, and/or to the inlet of the same macerator.

In one configuration the system comprises at least a first macerator, and a second pair macerator, optionally the system comprises a third macerator, and optionally one or more further macerators.

In one configuration a flow path is provided from the inlet of the system to the outlet of the system via the first macerator, followed by the second macerator, and optionally followed by the third macerator, and optionally followed by one or more further macerators.

In one configuration the rotation of the outer body relative the inner body comprises a rotation of the outer body on an outer body rotational axis, and the outer body comprises a body having a substantially circular cross-section along the outer body rotational axis.

In one configuration the rotation of the inner body relative the outer body comprises a rotation of the inner body on an inner body rotational axis, and the inner body comprises a body having a substantially circular cross-section along the inner body rotational axis.

In one configuration each of the inner body and outer body have a substantially circular cross-section along their respective inner body rotational axis and outer body rotational axis.

In one configuration the outer body rotational axis is the same as the inner body rotational axis, such that the rotation of the outer body and inner body are concentric.

In one configuration the inner body comprises one of a) a frusto-conical body, b) a conical body, and b) a cylindrical body.

In one configuration the outer body comprises one of a) a frusto-conical body, b) a conical body, and b) a cylindrical body.

In one configuration each of the inner body and the outer body comprise one of a) a frusto-conical body, b) a conical body, and b) a cylindrical body.

In one configuration the flow rate of the slurry through the macerator about 10, 20, 30, 40, 50, 60, 70, 80, 90, 100, 200, 300, 400, 500, 600, 700, 800, 900, or 1,000 liters per minute, and suitable ranges may be selected from between any of these values.

In one configuration the flow rate of the slurry through the macerator is about 80, 90, 100, 100, or 120 liters per minute.

In one configuration the ratio of carrier solvent (such as water) to material in the inlet slurry is about 1 L of solvent to about 0.5 kg of material, to about 0.5 L of solvent to about 1 Kg of material, and suitable ranges may be selected from between any of these values.

In one configuration the slurry comprises about 10, 15, 20, 25, 30, 35, 40, 45, or 50% by weight of material (such as plastic), and suitable ranges may be selected from between any of these values.

In one configuration the ratio of carrier solvent (such as water) to plastic provided to the macerator is at a ratio of approximately 1 L of carrier solvent to about 1 kg of plastic.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

In this specification, where reference has been made to external sources of information, including patent specifications and other documents, this is generally for the purpose of providing a context for discussing the features of the present invention.

Unless stated otherwise, reference to such sources of information is not to be construed, in any jurisdiction, as an admission that such sources of information are prior art or form part of the common general knowledge in the art.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which.

DETAILED DESCRIPTION OF THE INVENTION

Figure 1:
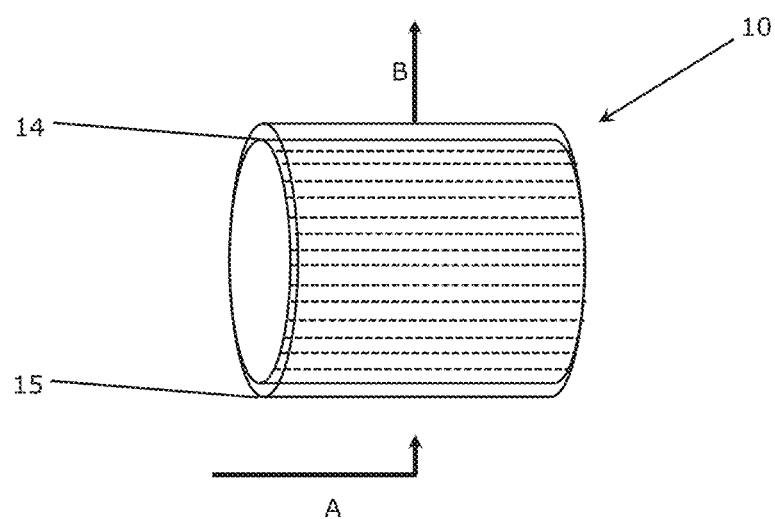
FIG. 1 shows a view of a macerator having a pair of bodies, where the bodies are of a cylindrical form having a horizontal axis of rotation.

Disclosed is a system, method and apparatus for processing an input material (for example plastics). The system, method and apparatus may be used for processing the input material (for example plastics) to a particle size less than 4 mm. The processed input material may be part of a slurry, the slurry comprising the input material particles and one or more liquids or solvents.

As used herein, the term "slurry" refers to a mixture of a solid particle suspended in, or as part of a mixture containing a liquid. Preferably the slurry comprises about 10, 20, 30, 40, 50, or 60% solid particles. In some embodiments the slurry is a homogeneous dispersion of particles suspended in a liquid phase.

The term particle size in the specification is used to describe an average size of the particle and/or a maximum dimension of a particle. It will be appreciated that when the term particle size in reference to the size of a particle in the slurry, it may be that not every single particle in the slurry may have such a particle size, instead it may be a substantial amount of the particles.

The system, method and apparatus may be used for the processing a variety of input plastics.

Although the specification refers to the processing of plastic, it will be appreciated that the system, method and apparatus may be used for the processing a variety of input slurries with different input materials and/or particle types.

Waste plastic provides a useful source of plastic for this process. In many countries waste plastic creates an environmental problem as society struggles to recycle or dispose of such plastic economically and safely. The sourced waste plastics may be for example the type of plastics derived from the waste recycling process. However, it will be appreciated various types of input plastic may be used depending on the desired output slurry.

The plastic may be selected from plastic that has a degree of rigidity. For example, LDPE in the form of shopping bags may not be used with a macerator as described, but LDPE in the form of crushed bottles may be used.

The waste plastic can be a mixture of any of polyethylene terephthalate (PETE or PET), high-density polyethylene (HDPE), polyvinyl chloride (PVC), polyethylene (PE), low-density polyethylene (LDPE), polypropylene (PP), polystyrene or styrofoam (PS), polycarbonate, polylactide, acrylic, acrylonitrile butadiene, styrene, fiberglass, rubber, paper and nylon. This waste plastic mixture may for example originate from a comingled plastic waste stream.

Given the wide use of plastic in society, the waste plastic is typically sourced from every-day waste products such as plastic bottles (e.g. milk, carbonated drinks, water bottles, cleaning products), plastic containers (e.g. for industrial products such as oil, food items), and packaging (whether rigid or soft), although it will be appreciated that the product list of waste products is immensely broad.

Waste plastic is typically categorised. For example, plastics are often stamped with a chasing arrows triangle encompassing an identifying number as shown below.

| Category | Plastic | Description of plastic products |
|---|---|---|
|  PETE | Polyethylene terephthalate | Soft drink bottles, mineral juice, fruit juice container, cooking oil |
|  HDPE | High density polyethylene | Milk jugs, cleaning agents, laundry determents, bleaching agents, shampoo bottles, washing and shower soap bottles |
|  PVC | Polyvinyl chloride | Trays for sweets or fruits |
|  LDPE | Low-density polyethylene | Crushed bottles |
|  PP | Polypropylene | Furniture, consumers luggage, toys, as well as bumpers, lining and external borders of cars, yoghurt and margarine tubs |
|  PS | Polystyrene | Toys, hard packing, refrigerator trays, cosmetic bags, costume jewellery, CD cases |
|  OTHER | Acrylic, polycarbonate, polyactic fibres, nylon, fibreglass | Large water bottles, some juice bottles |

One source of plastic may be shredded plastic. Shredded plastic may be shredded to a particle size of less than about 20 mm.

Plastic particles may be measured by direct imaging using light microscopy. Samples may first be analysed by laser diffraction technique using a CILAS 1180, to have a general idea of the particle size distribution. A suspension of plastic may be placed in a Sedgewick Rafter cell (SRC) etched with a 50 column by 20 row grid. Size and particle count measurements may be determined at 100× and 200× magnifications with an Olympus BX 51 calibrated eyepiece binocular microscope with QCapture Pro 5.1 imaging software. For each sample three replicates may be used and the longest length of the first 100 particles in 6 randomly selected transects measured. To determine particle size distribution, 300 particles from each sample may be measured. The lengths may be manually determined with an ocular calibrated micrometer and the values were converted to microns or mm.

Flow cytometry may be used to analyse particles in the sub 70 µm range.

The shredded plastic may have a particle size of about 2, 3, 4, 5, 6, 7, 8, 9, 10, 11, 12, 13, 14, 15, 16, 17, 18, 19 or 20 mm, and suitable ranges may be selected from between any of these values, (for example, about 2 to about 20, about 2 to about 18, about 2 to about 15, about 2 to about 10, about 2 to about 8, about 3 to about 20, about 3 to about 17, about 3 to about 16, about 3 to about 12, about 3 to about 10, about 3 to about 7, about 4 to about 20, about 4 to about 18, about 4 to about 14, about 4 to about 10, about 4 to about 8, about 5 to about 20, about 5 to about 19, about 5 to about 15, about 5 to about 10, about 6 to about 20, about 6 to about 17, about 6 to about 13, about 6 to about 10, about 7 to about 20, about 7 to about 18, about 7 to about 16, about 7 to about 10, about 8 to about 20, about 8 to about 18, about 8 to about 15, about 8 to about 10, about 9 to about 20, about 9 to about 16, about 9 to about 14, about 10 to about 20, about 10 to about 17, about 11 to about 20, about 11 to about 17, about 12 to about 20, about 12 to about 18 or about 13 to about 20 mm).

Various methods are known to reduce the original plastic products to a particle size as described above. For example, the use of cutting and/or extruders, shredders, granulators or grinders. Cutting and extruding machines (e.g. see U.S. Pat. No. 9,744,689) can include one or more knives that rotate in a housing such that any plastic introduced into the housing is cut by the knives into smaller particles. In some machines the plastic may start to melt, or melt, due to the action of the knives (i.e. by the heat produced by friction) and such melted or partially melted plastic may enter an extruder in which the screws carry the plastic away from the cutting blades. The plastic may then be extruded and cut into small pallets at the outlet of the extruder.

Shredders (e.g. see U.S. Pat. No. 6,241,170), granulators (e.g. see U.S. Pat. No. 6,749,138) and grinders (e.g. see U.S. Pat. No. 5,547,136 or German patent DE 19614030 A1) may include a single or plurality of cutting wheels or rollers that again rotate in a housing and reduce the size of the plastic through the action of the cutting wheel or rollers against the plastic as the plastic passes between the cutting wheels or roller and the internal surface of the housing. Alternately, the plastic may pass between two or more banks of knives or rollers, that in some cases overlap, such that the plastic is cut or ground due to this passage.

Such processes typically use rotary knives or bed knives whose rotation cuts the plastic into smaller particles or pieces.

A further source of plastic could include a homogenised slurry of plastic having a particle size of less than 10 mm. Preferably the shredded plastic has a particle size of less than about 0.5, 1, 2, 3, 4, 5, 6, 7, 8, 9, or 10 mm, and suitable ranges may be selected from between any of these values, (for example, about 2 to about 10, about 2 to about 8, about 2 to about 6, about 2 to about 5, about 3 to about 10, about 3 to about 9, about 3 to about 8, about 3 to about 6, about 4 to about 10, about 4 to about 8, about 4 to about 6, about 5 to about 10, about 5 to about 9 or about 6 to about 10 µm).

An example of a homogeniser to achieve the above is the use of a macerator having two or more concentric cylindrical bodies that rotate relative to each other. This is described in Section 4 below.

Figure 16:
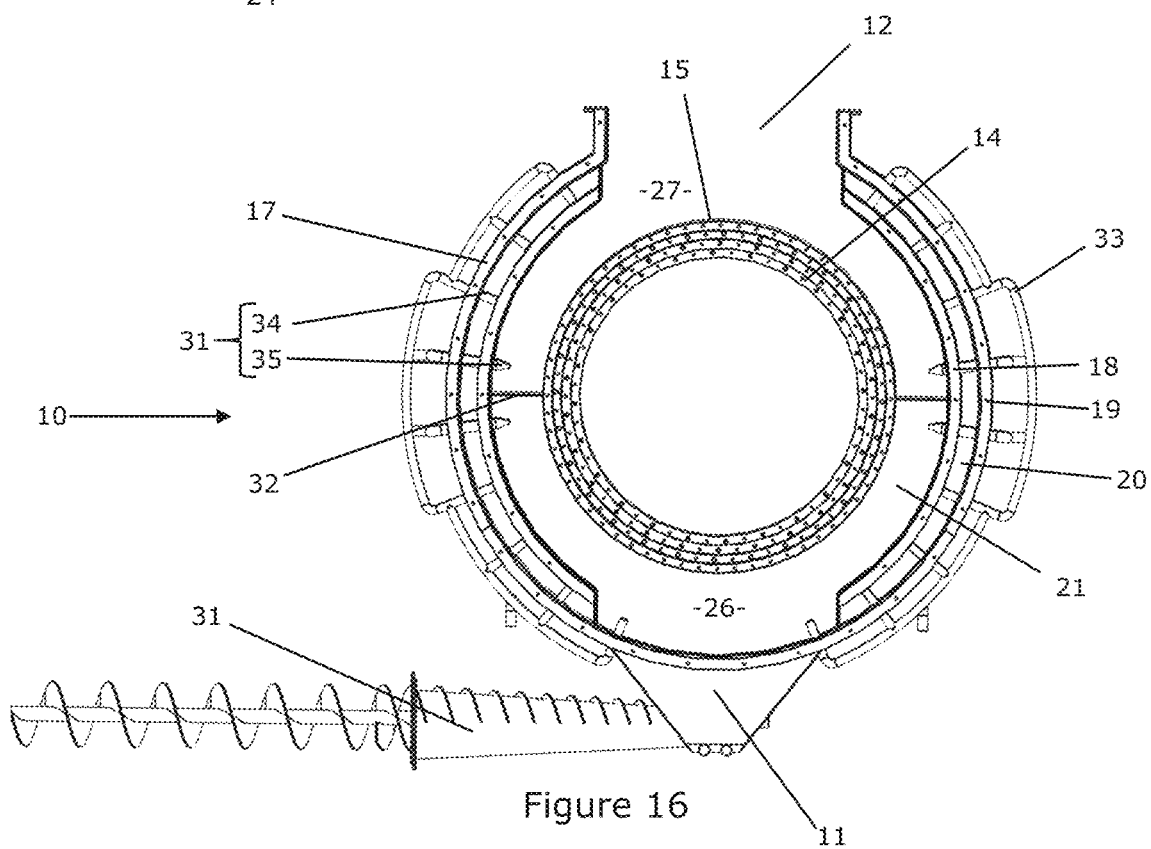
FIG. 16 shows a side view of a macerator chamber, showing a macerator having four concentric bodies.

The method as described may use plastic that may be wet that is introduced into the macerator inlet. The plastic may be mixed with a carrier at this point. For example, the carrier may be water. For example, as seen in FIG. 16 is a side view of a macerator 10.

In some embodiments the inlet may include an air inlet, that is, air may be introduced into the inlet via an air inlet. Without wishing to be limited by theory, the air may assist to prevent clumping of the plastic particles at the inlet.

The method as described may produce an emulsion being a plastic suspended in a carrier. The carrier can be selected from a range of different solvents, such as water or organic solvents. Suitable solvents to form the slurry include a haloalkane (for example methyl chloride).

In some embodiments plastic slurry in the macerator may comprise up to about 40, 45, 50, 55 or 60% by weight plastic, and suitable ranges may be selected from between any of these values. That is, the slurry may comprise at least 40, 45, 50, 55 or 60% carrier, and suitable ranges may be selected from between any of these values.

Figure 8:
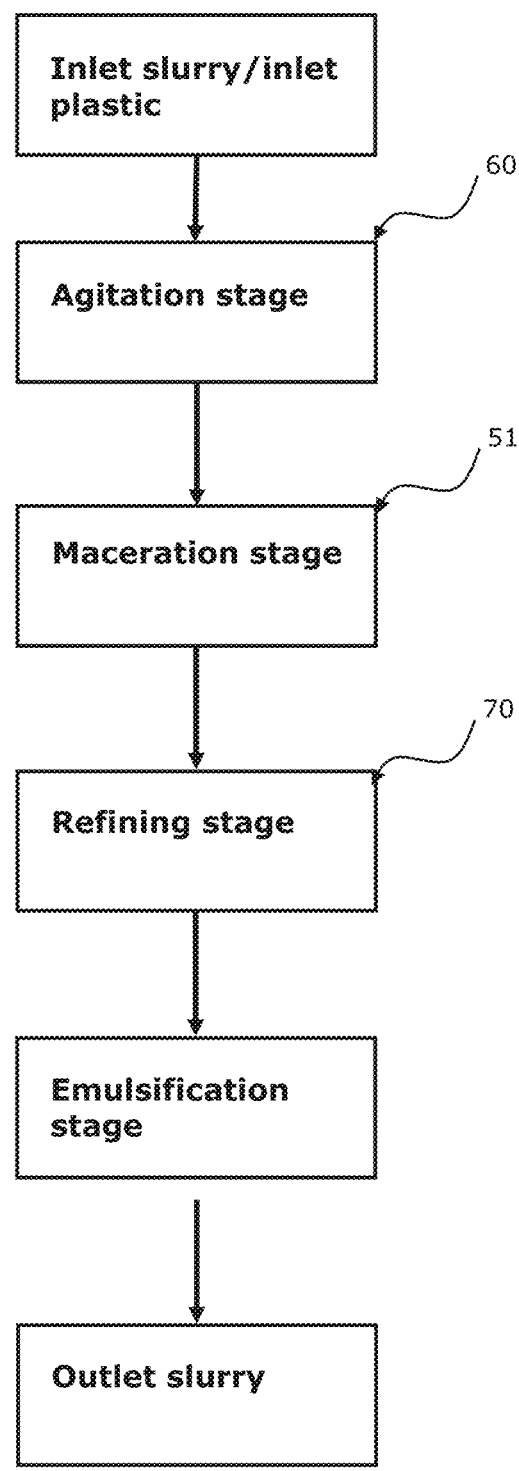
FIG. 8 shows a diagram of the system and/or method of processing plastic.
Figure 9:
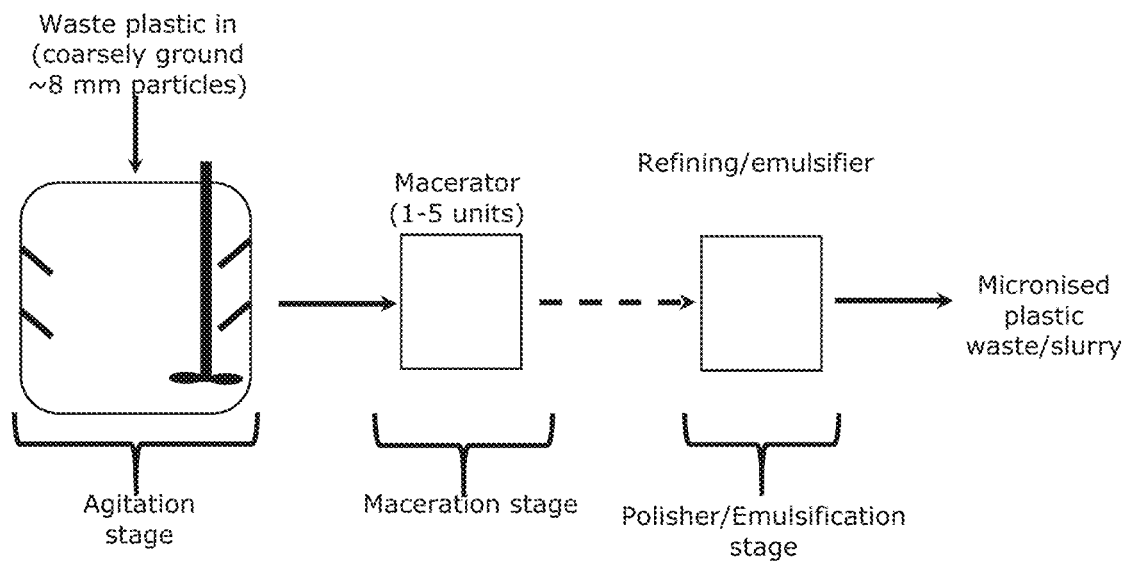
FIG. 9 shows a diagram of a system of processing plastic.
Figure 11:
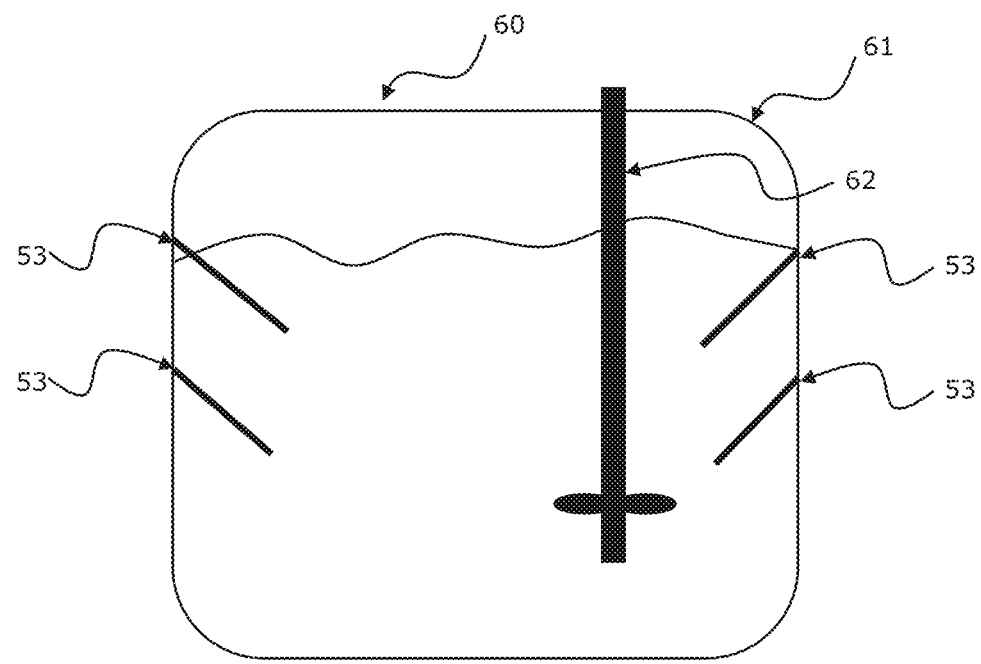
FIG. 11 shows an agitation stage.
Figure 12:
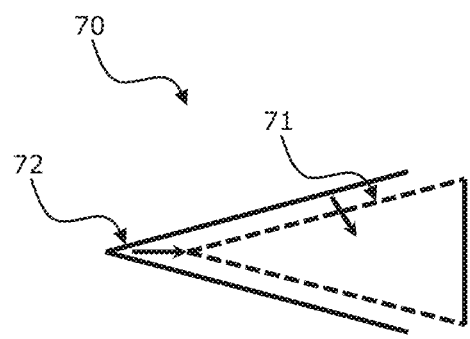
FIG. 12 shows a refiner.
Figure 13:
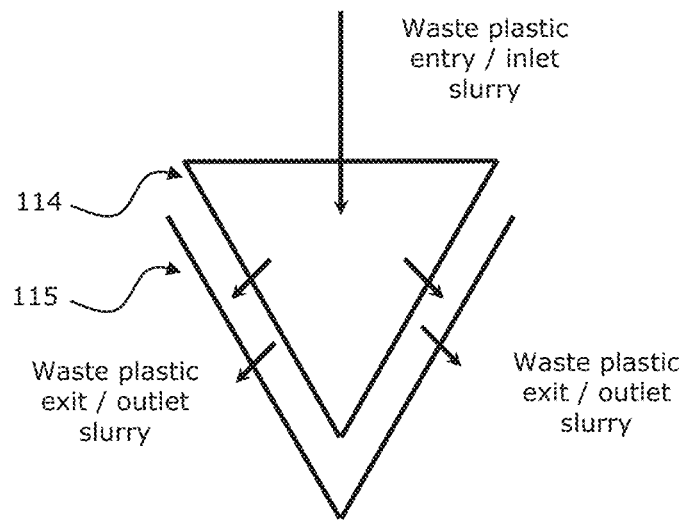
FIG. 13 shows a section view through an embodiment of a macerator.
Figure 14:
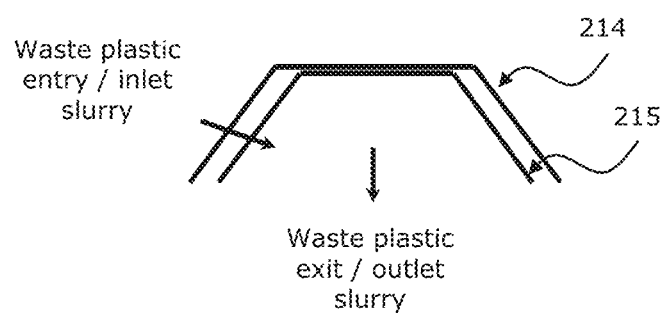
FIG. 14 shows a section view through an embodiment of a macerator.

The plastic slurry for introducing into the macerator may be initially subjected to an agitation step. An agitator 60 is shown in FIGS. 8 and 11. The agitator may assist in producing a homogenous mix of plastic in carrier for injection or feeding into the macerator.

The agitator 60 may receive solid material (such as plastic) having a particle size of about 5, 6, 7, 8, 9, 10, 11, 12, 13, 14, 15, 16, 17, 18, 19 or 20 mm as described above, and suitable ranges may be selected from between any of these values.

The agitator 60 may receive material having a homogenous or semi-homogenous particle size. For example, the agitator 60 may receive material having a particle size of approximately 8 mm. In another embodiment the particle size of the material has a size distribution whereby at least 90, 91, 92, 93, 94 or 95% of the material has a mean particle diameter of 5, 6, 7, 8, 9, 10, or 11 mm, and suitable ranges may be selected from between any of these values.

The particle size of the input material may have a particle size distribution whereby at least 90% of the particles have a diameter of about 5, 6, 7, 8, 9, 10 or 11 mm. In one embodiment, the invention relates to a population of material particles wherein at least 90% of the particles have a diameter within 1 mm of the mean diameter of the population.

The agitator 60 may be in the form of a vessel or tank 61 that includes a stirrer 62 having at least one blade on its end as shown in FIG. 11.

The system inlet slurry is provided to an inlet of the agitation stage 60, and an outlet of the agitation stage 60 provides the agitated slurry to the maceration stage.

The agitator stage 60 may comprises a vessel 61 comprising a stirrer 62. The stirrer 62 may be configured to agitate the system inlet slurry within the vessel 61 to produce agitated slurry. Preferably the stirrer 62 creates a vortex within the vessel. Without wishing to be restrained by theory, the vortex assists in keeping the waste plastic particles suspended in the vessel, to prevent the waste plastic from settling at the bottom of the vessel.

Alternatively, where the density of the waste plastic is less than the density of the carrier liquid, the plastic may at least partially float within the vessel. In such a configuration, the stirrer 62 may preferably create a vortex or flow within the vessel to draw the plastic from floating in the vessel downwards to an outlet of the vessel to the macerator 10.

The stirrer 62 may create a homogeneous mix of plastic and solvent such as water within the vessel.

The stirrer 62 of the agitator 60 may operate at a rotational rate that achieves substantial homogeneity of the material within the slurry. By "substantial", this means at least 70, 75, 80, 85, 90 or 95% homogeneity. Without wishing to be bound by theory, this degree of homogeneity is sufficient to achieve the desired input feed rate of the material to the macerator 10, without the macerator jamming. For example, the stirrer may be operated at speeds of approximately 100 RPM to approximately 5,000 RPM.

In some forms, the stirrer 62 may increase in operational speed over the processing of a fixed quantity of plastic from the vessel. For example, if the mass or volume of plastic relative to the volume of solvent in the vessel decreases over the operation of the process, the operational speed of the of the stirrer may be increased in order to maintain a constant, or substantially constant, flow rate of plastic from the outlet of the vessel and to the macerator 10. For example, the stirrer 62 may begin at approximately 2,000 RPM, and be increased to approximately 5,000 RPM by the end of processing of a fixed quantity of plastic from the agitator.

In addition or alternative, in some forms the operational speed of the stirrer 62 may be controlled dependent on the size, or average size, of the plastic particles within the vessel.

In some embodiments the agitator 60 comprises one or more baffles 53, the one of more baffles 53 extending from an inner wall of the vessel 61. Without wishing to be bound by theory, the baffles 53 may act to retain the plastic particles to the centre of the vessel 61.

The stirrer 62 may act to further reduce the particle size of the plastic.

In some embodiments a plate is located above the stirrer blade. The plate may have a diameter about equal to the diameter of the stirrer blades. Preferably the diameter of the blade is 80, 95, 90, 95, 100, 105, 110, 115 or 120% the diameter of the stirrer blade, and suitable ranges may be selected from between any of these values.

In some embodiments the waste plastic from the outlet of the agitation stage has a particle size of 0.5, 1.0, 1.5, 2.0, 2.5, 3.0, 3.5 or 4.0 mm, and suitable ranges may be selected from between any of these values.

The plastic enters the inlet of the agitator 60 as a slurry as described. The liquid, that forms the slurry with the plastic particles, can be water or a solvent or a combination thereof.

The solvent(s) may be selected from water, an organohalide solvent, an aromatic hydrocarbon solvent, a mineral spirit, a dearomatised hydrocarbon solvent or a combination thereof.

An organohalide solvent is one that has a halide substituent. For example, the halide group may be selected from a fluoride or chloride. The organohalide solvent may be a haloalkane. The organohalide solvent may be a $C_1$, $C_2$, $C_3$, $C_4$, $C_5$, $C_6$, $C_7$, $C_8$, $C_9$ or $C_{10}$ hydrocarbon. The organohalide solvent may be an organochloride solvent. An organochloride solvent is a compound that contains at least one covalently bonded atom of chlorine, such as methyl chloride (one Cl atom) or methylene chloride (two Cl atoms). Examples of a suitable organochloride solvent is methyl chloride, methylene chloride or trichloroethylene, or a combination thereof.

An aromatic hydrocarbon solvent is one that has an aromatic substituent group. In one embodiment the aromatic group is a benzene ring. Preferably the aromatic group has one or more functional groups. The functional groups may be selected from one or more of a methyl or ethyl group. The aromatic hydrocarbon solvent may be selected from toluene or xylene, or a combination thereof. Tolune is an aromatic hydrocarbon and commonly used as a solvent for paint and paint thinners.

A mineral spirit (also referred to as white spirit, petroleum spirit or turpentine) is a mixture of aliphatic, open-chain or alicyclic $C_7$ to $C_{12}$ hydrocarbons.

Dearomatised solvents are highly hydrogenated solvents that have a low aromatic content and are generally classed as aliphatic mineral spirits. The dearomatised solvent may be selected from the Exxsol™ range of solvents provided by ExxonMobil Chemical. For example, the dearomatised solvent may be selected from Exxsol™ D40, Exxsol™ D60, Exxsol™ D80 or Exxsol™ D100, or a combination thereof. The dearomatised solvent may be selected from the ShellSol range such as ShellSol D60 which consists predominantly of $C_{10}$-$C_{12}$ paraffins and naphthenes.

The solvent may comprise trichloroethylene. We have found that trichloroethylene is efficient at breaking down ABS plastics and styrene.

The solvent may comprise methylene chloride. We have found that trichloroethylene is efficient at breaking down ABS plastics and styrene.

As discussed above, it is important to match the solvent being used to the plastic source. For example, a dearomatised solvent or xylene (alone) may not be effective where the plastic is ABS. Preferably, where the plastic is ABS the solvent is selected from an organohalide solvent such as trichloroethylene or methylene chloride.

In one embodiment a combination of solvents is used.

For example, the combination of solvents may comprise a solvent and a co-solvent. As an example of this, a solvent (acting as a co-solvent) such as an organohalide solvent (e.g. trichloroethylene or methylene chloride) may be used in a smaller amount or concentration relative to it being used as a solvent. A second solvent, such as a dearomatised solvent may then be used to continue the breakdown of the plastic. In this manner, it may be possible to reduce the amount of less environmentally friendly solvents used in the process.

A mineral spirit may be added as a solvent or co-solvent to the mixture. In one embodiment we have found that the mineral spirit reduces the drying time of the binder.

In some embodiments the agitator is operated for at least 1, 2, 3, 4, 5, 6, 7, 8, 9, 10 min, and suitable ranges may be selected from between any of these values.

In some embodiments the agitator is run as a continuous process, with the slurry exiting the outlet of the agitator with plastic particles that have reached a particle size of less than 0.5, 1.0, 1.5, 2.0, 2.5, 3.0, 3.5 or 4.0 mm, and suitable ranges may be selected from between any of these values.

This particle size selection can be achieved through the use of a particle size selector on the outlet pipe, such as a mesh having a mesh size that allows plastic particles below a desired size through. The stirrer acts to prevent build-up of larger-sized plastic particles about the size selector at the outlet.

Figure 15:
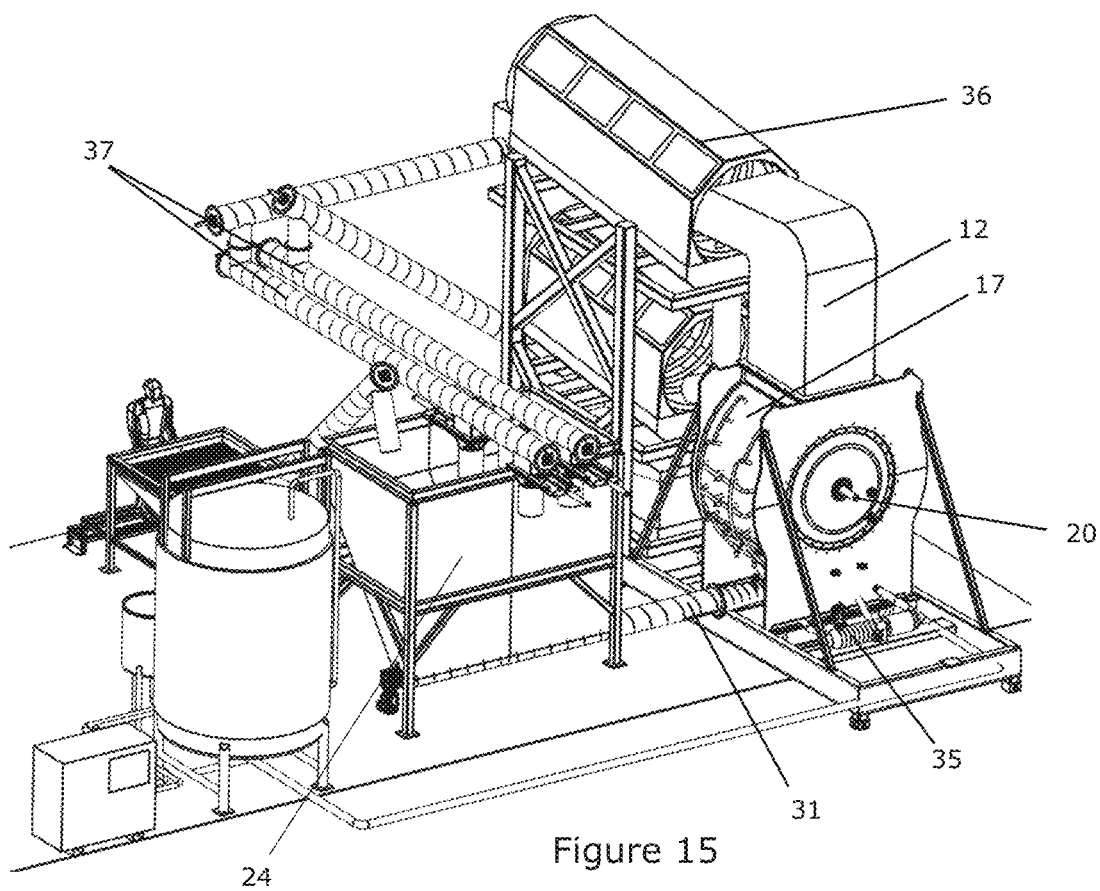
FIG. 15 shows a perspective view of a macerator system as described.
Figure 17:
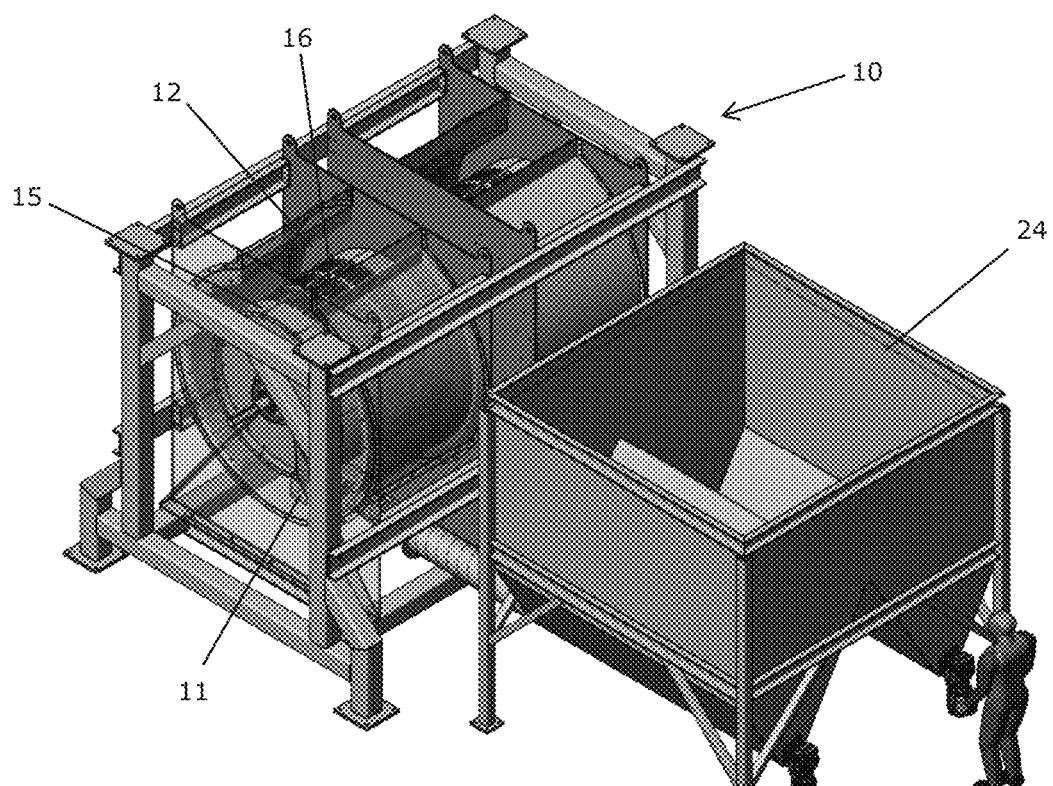
FIG. 17 shows a perspective view of a macerator setup as described.
Figure 18:
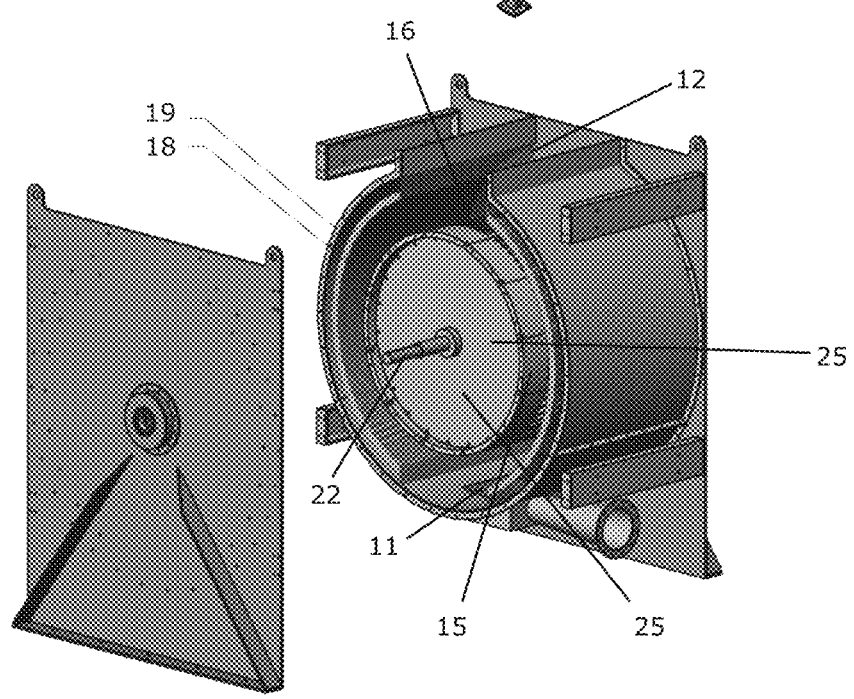
FIG. 18 shows a perspective view of a macerator as described.
Figure 19:
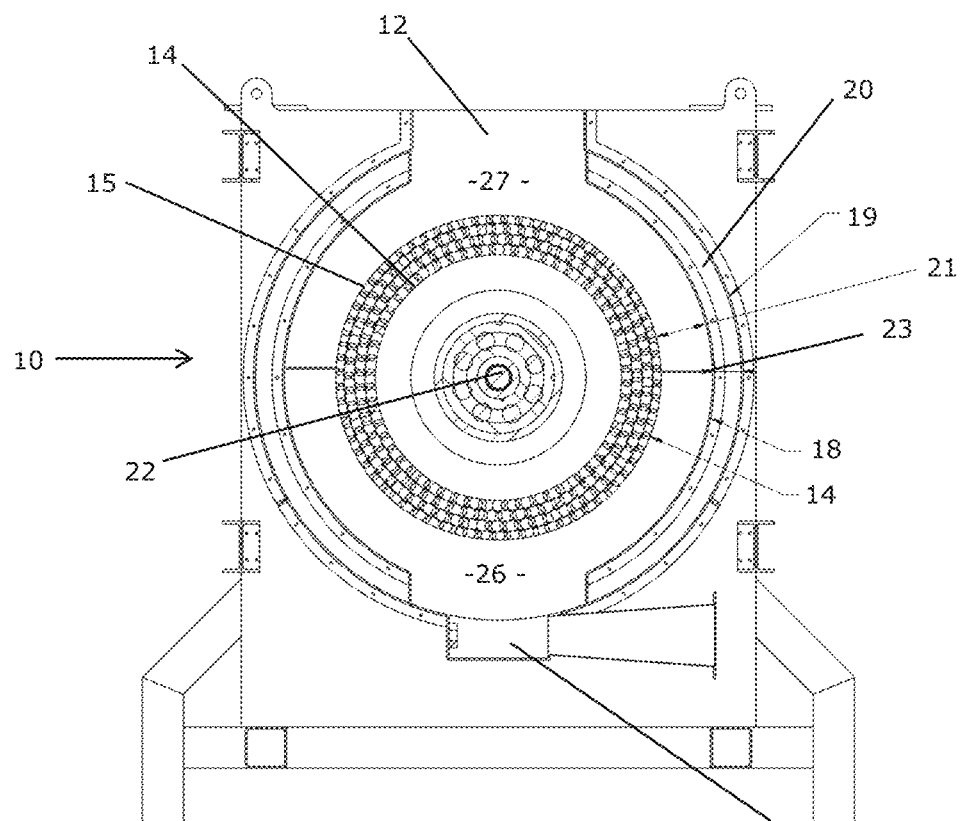
FIG. 19 shows a cross-sectional view of a macerator as described.
Figure 20:
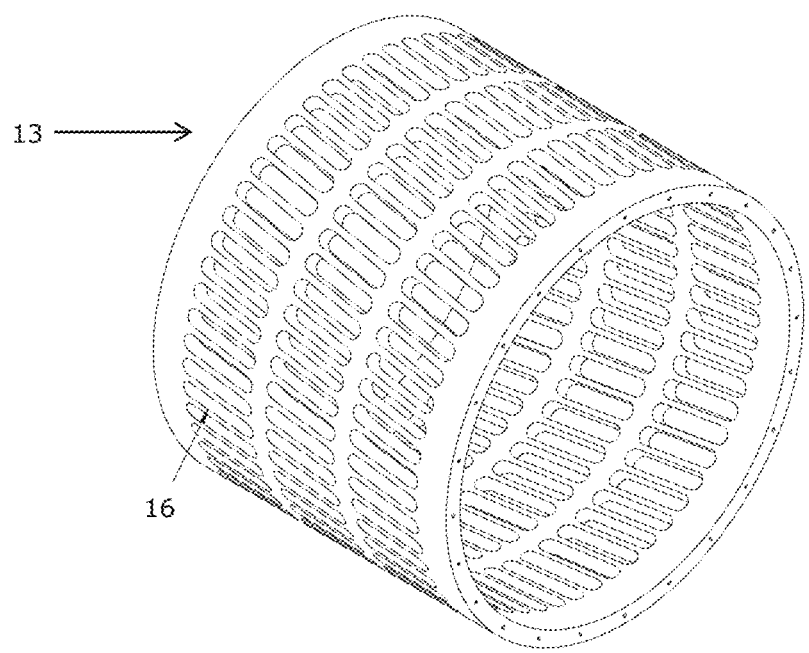
FIG. 20 shows a perspective view of a body with three banks of slots or apertures.

The process includes the use of one or more macerators 10, for example as shown in FIGS. 1 to 7, and 16-19. The macerator 10 may form part of the system or method as shown in FIG. 15 or 17 or as described herein. The macerator 10 may comprise an inlet 11. The inlet 11 may be configured to receive a flow of plastic particles. The plastic particles may be in the form of a slurry, or wet, or dry. The macerator 10 may also comprise an outlet 12. The outlet 12 may be configured to provide the outlet slurry from the macerator 10.

As shown in FIG. 17 the macerator 10 comprise a housing 17. The housing 17 may comprise an inner casing 18 and an outer casing 19 that defines an intermediate space 20. The inner casing may comprise a plurality of apertures or slots that allow the slurry to be fluidly connected between the gap area 21 (i.e. the volume of space between the outer body 13 and the inner surface of the housing 17 or the inner casing 19. The inner casing 18 may be, or comprise wedge wire. The size of any slot, aperture or wedge wire may be such that it prevents any plastic from the slurry from entering the intermediate space 20.

The width of the intermediate space 20 will depend on the size of the masticator. To provide guidance, for a masticator with an outer body diameter of about 1.8 m the gap bay be about 200 to about 300 mm. For the same size masticator the intermediate space may be about 100 to 150 mm wide.

The masticator 10 may comprise baffles 32 that extend in a direction along the axis of rotation, that is, from the front to the rear of the masticator body. The baffles 32 may be positioned to separate the gap 21 space into two portions. In one embodiment the baffles 32 may be positioned so that they are about level with the axis of rotation. That is, such positioning would separate the chamber into two substantially equal hemispheres (26 and 27 of FIGS. 16 and 19).

As shown in FIGS. 15 and 16, the plastic may be injected into the macerator chamber via a screw 31 that receives the plastic from a hopper 24. The carrier (e.g. water) may be pumped into the chamber to mix with the plastic and create the slurry.

The screw 31 may have a reducing diameter. This may assist to produce a plug of plastic in the screw preventing water in the masticator chamber from flowing back up the screw 31.

The masticator 10 comprises the particles in a carrier. The carrier (e.g. water) may be injected into the masticator chamber via a pump. For example, the pump may be a displacement pump that pumps the carrier into the masticator chamber.

The macerator 10 may comprise a vacuum pump that applies a vacuum to the chamber outlet. The vacuum pump may achieve a head pressure at the outlet of about 2.5, 3.0, 3.5, 4.0, 4.5, 5.0, 5.5, 6.0, 6.5, 7.0, 7.5, 8.0, 8.5, 9.0, 9.5 or 10 psi, and suitable ranges may be selected from between any of these values, (for example about 2.5 to about 10.0, about 2.5 to about 8.5, about 2.5 to about 4.5, about 3.0 to about 10.0, about 3.0 to about 7.0, about 4.0 to about 10.0, about 4.0 to about 8.5, about 4.0 to about 6.0, about 4.5 to about 10.0, about 4.5 to about 8.5, about 5.0 to about 10.0, about 5.0 to about 8.0, about 5.5 to about 10.0, about 5.5 to about 9.0 or about 6.0 to about 10.0 psi). The pump is preferably an impeller pump.

As shown in FIG. 16 the macerator 10 comprises the one or more injectors 31 assist or direct the flow of slurry through the apertures of the bodies. That is, the plastic particles may collect near the baffles 32 or substantially bypass the apertures of the bodies. The liquid injection assists in directing the plastic through the apertures of the bodies.

In one embodiment the injectors 31 may inject liquid into the first portion 26 adjacent to or proximal to the baffle 32. That is, the injector 31 may have an outlet that is proximal to, or adjacent the baffle 32. The injectors 31 may inject a low volume but high pressure stream of liquid to force the plastics through the apertures of the bodies and prevent collecting of the plastic particles near the baffle.

The macerator 10 may comprise injectors 31 that may inject liquid into different regions of the macerator 10, such as injectors 34 that inject water into the intermediate space 20 or adjacent the wedge wire 18. The injectors 34 may inject liquid (i.e. water or organic solvent) into the gap 21 proximal and distally to the baffle 32. The macerator 10 may also include one or more injectors 34 that inject liquid into the gap 21 in the second portion 27. Preferably the injection is at a location in the second portion 27 adjacent or proximal to the baffle 32.

The injectors 31 may include injectors 35 that inject liquid into the gap region 21. Such injectors 35 may inject liquid adjacent the baffle 32 in the first portion 26. Such injectors 35 may inject liquid adjacent the baffle 32 in the first portion 27.

In one configuration the pressure of the liquid injected from the injectors 31 proximal to the baffle 32 is greater than the pressure of liquid injected by the injectors located distally to the baffle 32. That is, there may be a gradient of pressure that is greatest closest to the baffle 32 that decrease as the injector 31 outlet is locate more distal to the baffle 32.

In one embodiment the entire intermediate zone 20 may be pressurised so that there is water directed about a substantial part of the surface area of the inner casing.

The injector 31 may be a pump that comprises a conduit and outlet to the conduit that vents into the gap 21 or the intermediate space 20.

In one configuration the outlet conduit of the pump may traverse the outer casing so that the outlet injects liquid into the intermediate space 20 (if present) or the gap 21.

The injectors may be fed by one or more pumps. For example, the injectors may be fed by a multistage pump. In some embodiments the injectors may be divided into two or more sections, with each section being fed by a separate pump. For example, the injectors 34 may be fed by a separate pump to the injectors 35.

The injectors 35 that penetrate into the gap 21 may have about 3, 4, 5, 6, 7, 8× more pressure output than the injectors 34 that outlet into the intermediate space 20, and suitable ranges may be selected from between any of these values.

In some embodiments the pump may be an impeller pump. The pump may be a multistage impeller pump having a pump output of 100, 150, 200, 250, 300, 350, 400, 450, 500, 550 or 600 L/min, and suitable ranges may be selected from between any of these values.

The injector system may include one or more valves to direct the liquid flow to a plurality of injectors. For example, the valve may be a motorised ball valve.

In one embodiment the injector 31 provides a jet of liquid at high pressure. That is, the volume of water may be quite low, but the pressure is high as the jet is quite constrained in terms of its diameter.

The intermediate space 20 may be isolated from the gap space 21 so that plastic containing slurry is not able to access the intermediate space 20. This may be achieved by the aperture or slot size of the inner casing being smaller than the plastic particle size.

The injectors 31 may be fed by one or more conduits 33.

The pressure in the intermediate space 20 may be at least 2.5, 3. 3.5, 4.0, 4.5, 5.0, 5.5, 6.0, 6.5, 7.0, 7.5 or 8 times the pressure of the slurry in the gap space 21, and suitable ranges may be selected from between any of these values, (for example, about 2.5 to about 8.0, about 2.5 to about 7.0, about 2.5 to about 6.0, about 2.5 to about 5.0, about 3.0 to about 8.0, about 3.0 to about 7.5, about 3.0 to about 6.0, about 3.5 to about 8.0, about 3.5 to about 7.0, about 3.5 to about 6.5, about 4.0 to about 8.0, about 4.0 to about 7.0, about 4.0 to about 6.0, about 5.0 to about 8.0, about 5.0 to about 6.5, about 5.5 to about 8.0, about 5.5 to about 7.5 or about 6.0 to about 8.0 times the pressure of the slurry in the gap space 21).

The temperature of the slurry may be less than about 30, 25, 20, 15, or 10° C., and suitable ranges may be selected from between any of these values. In one configuration the injected liquid is chilled. In one embodiment the injected liquid is water.

Tthe pressure in the chamber may be about 3, 4, 5, 6, 7, 8, 9, 10, 11, 12, 13, 14 or 15 psi, and suitable ranges may be selected from between any of these values, (for example, about 3 to about 15, about 3 to about 13, about 3 to about 10, about 3 to about 8, about 4 to about 15, about 4 to about 12, about 4 to about 8, about 5 to about 15, about 5 to about 12, about 5 to about 10, about 6 to about 15, about 6 to about 13, about 6 to about 10, about 6 to about 8, about 7 to about 15, about 7 to about 12, about 7 to about 10, about 8 to about 15, about 8 to about 13, about 8 to about 10, about 9 to about 15, about 9 to about 13, about 10 to about 15 psi).

The macerator 10 may comprise 3, 4, 5, 6, 7 or 8 concentric bodies, and suitable ranges may be selected from between any of these values. In one configuration each body rotates a direction opposite to an adjacent body.

The bodies may comprise a shield 25 at the first and second end to enclose the bodies, and ensure that the slurry has to traverse as many of the apertures of the bodies as possible. For example, since plastic floats, ideally this provides direction for the plastic (assisted by the vacuum pressure at the outlet) for the plastic (for example in the case of a two body masticator) to be cut four times. i.e. once through the outer body, then inner body then the inner body on the second portion side of the chamber and the outer body and then out the outlet.

The process may reduce the particle size between the chamber inlet and chamber outlet by at least 40, 45, 50, 55, 60, 65, 70, 75, 80, 85, 90, 95%, and suitable ranges may be selected from between any of these values.

The process may produce particles having a mean particle size of less than 20, 19, 18, 17, 16, 15, 14, 13, 12, 11, 10, 9, 8, 7, 6, 5, 4, 3, 2 or 1 μm, and suitable ranges may be selected from between any of these values.

In one configuration the outlet is configured to provide a flow of outlet slurry comprising plastic particles having a particle size being less than the particle size of the plastic particles of the inlet slurry.

The outlet may combine one or more surfaces being a porous surface, such as wedge wire. The head pressure of the outlet slurry may force the outlet slurry upwards and out of the outlet to a conduit in which one or more surfaces of the conduit are formed from a porous material. This allows some of the liquid carrier to drain from the outlet slurry. Having the pores smaller than the size of the macerated particles ensures that the particles are not also lost from the outlet.

The liquid can then be captured and recirculated through the system. If the liquid is cooled, then this ensures that a certain amount of energy been used to run the system is not lost from the system.

In one embodiment the draining of the liquid at the outlet provides a slurry with a solids content of about 60, 65, 70, 75, 80, 85 or 90%, and suitable ranges may be selected from between any of these values, (for example 60 to about 90, about 60 to about 80, about 70 to about 75, about 65 to about 90, about 65 to about 85, about 70 to about 90, about 70 to about 80, about 75 to about 90, about 75 to about 85 or about 80 to about 90% solids content).

The macerated particles may then go through a separator system 36 that separates the particles by size. As an example, the separator system may be a rotary shear separator. It may also be selected from a centrifugal separator. The system is shown in FIG. 15. In this figure the system may have three separator systems 36 which allow sizing of the particles into at least three size classifications. The system may also include outlet pipes 37 from the separators which may go to an outlet collection bin, or may be recirculated into the hopper 24 for further processing by the macerator.

Figure 2:
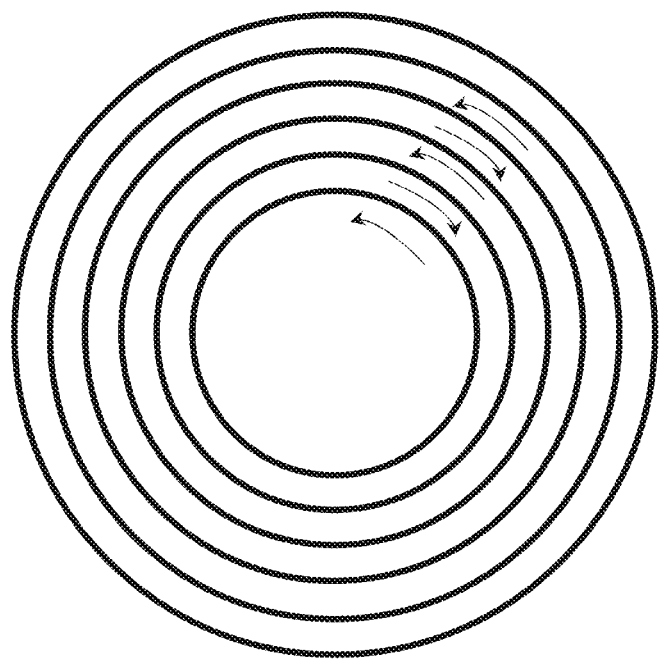
FIG. 2 shows a top view of a macerator having six bodies, and the arrows showing their direction of rotation.

As mentioned, the macerator 10 may comprise a plurality of concentric cylindrical bodies 13, either as a pair of bodies, or a plurality of bodies in stacked relationship as shown in FIGS. 2 and 16. The bodies 13 therefore comprise at least an inner body 14 and an outer body 15. Each adjacent body such as an inner body 14 and an outer body 15 rotate relative to each other. For example, one body may be fixed, and the adjacent body rotate, or both bodies may rotate in an opposite directions to each other.

Figure 3:
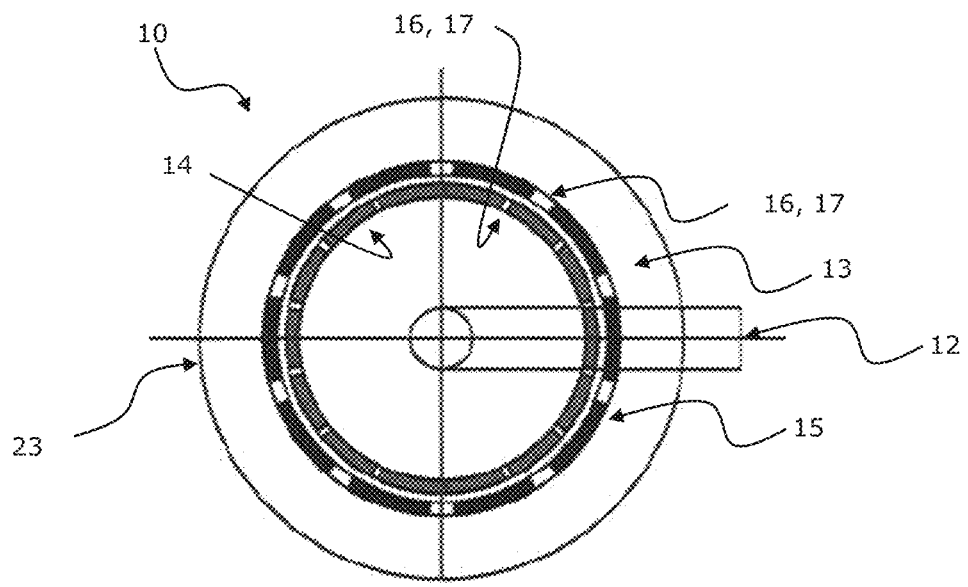
FIG. 3 shows a view of a macerator with a pair of bodies within a housing.

As shown in FIGS. 1 and 3 is a macerator comprising a single pair of bodies 14 (inner) and 15 (outer). The plastic is inlet at "A" and outlets at "B". Alternately the macerator can have more than two bodies as shown in FIG. 2. FIG. 2 is a top view of a macerator having six bodies. Shown by the arrows in FIG. 1C is the direction of travel of each body. Starting with the outer most body, shown is that it remains static, that is, it does not rotate. The second body rotates anti-clockwise. In one embodiment the outer most body may rotate counter to the second body—so clockwise in this example. The third body rotates clockwise and the next body rotates counter clockwise etc.

The inner body 14 and the outer body 15 rotate relative to each other at a rotational speed of about 100, 150, 200, 250, 300, 350, 400, 450, 500, 550, 600, 650, 700, 750, 800, 850, 900, 950 or 1,000 RPM, and suitable ranges may be selected from between any of these values, (for example, about 100 to about 1000, about 100 to about 900, about 100 to about 700, about 100 to about 600, about 100 to about 500, about 200 to about 1000, about 200 to about 800, about 200 to about 700, about 200 to about 600, about 200 to about 500, about 200 to about 400, about 300 to about 1000, about 300 to about 900, about 300 to about 700, about 300 to about 600, about 300 to about 500, about 300 to about 400, about 400 to about 1000, about 400 to about 700, about 400 to about 600, about 400 to about 500, about 500 to about 1000, about 500 to about 900, about 500 to about 700, about 500 to about 600, about 600 to about 1000, or about 600 to about 700 RPM).

The speed of relative rotation of the inner body 14 and outer body 15 may be provided dependent on one or more other variables, such as for example the feed rate of plastic and carrier solvent to the macerator 10, the proportion of plastic to carrier solvent in the inlet feed, the type of carrier solvent, the maximum particle size of inlet plastic, the average particle size of inlet plastic, the dimensions of the macerator 10 relative to a) the inlet particle size, b) the inlet plastic and/or carrier flow rate, c) the dimensions of the inlet conduit to the macerator, and/or d) the type or types of inlet plastic. It may also be dependent on, either separately or in addition, the dimensions or other characteristics of the agitator, the fill level of the agitator, the relative proportions of plastic and solvent in the agitator, and the agitator RPM rate.

The slot or apertures in the bodies provide elongate sections of the bodies adjacent the slot or aperture having a leading and trailing edge.

In one embodiment the leading edge and trailing edge of the elongate sections of the body are positioned parallel to the notional circumference of the rotational axis of the body.

Figure 4:
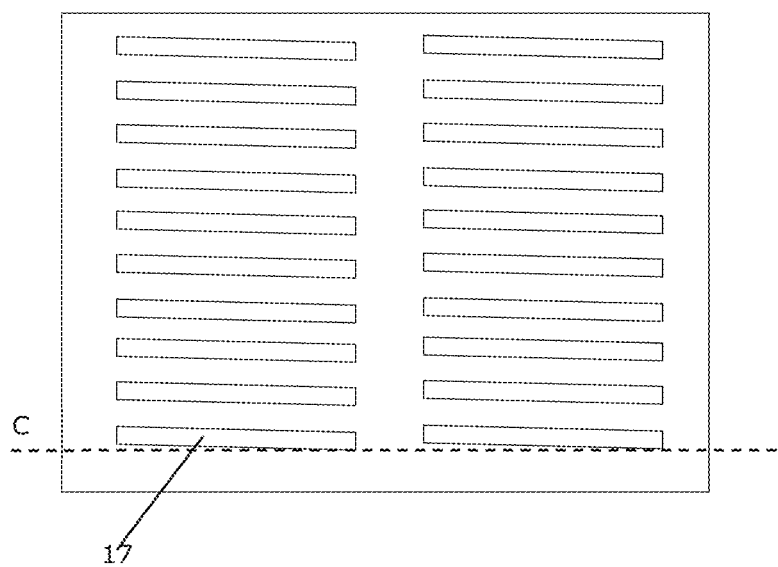
FIG. 4 shows a side sectional view of a macerator body having a horizontal axis of rotation.
Figure 5:
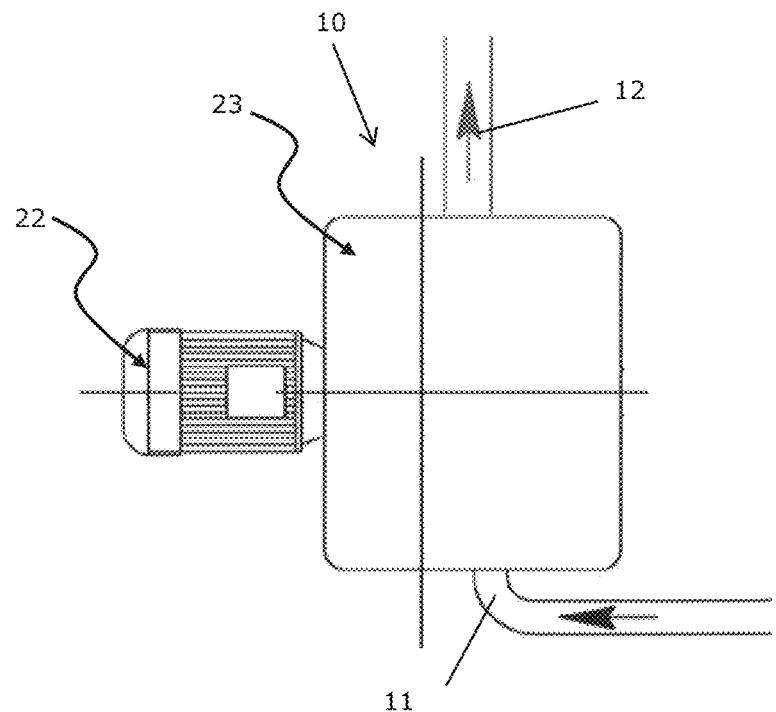
FIG. 5 shows a cross-sectional view of a macerator.
Figure 6:
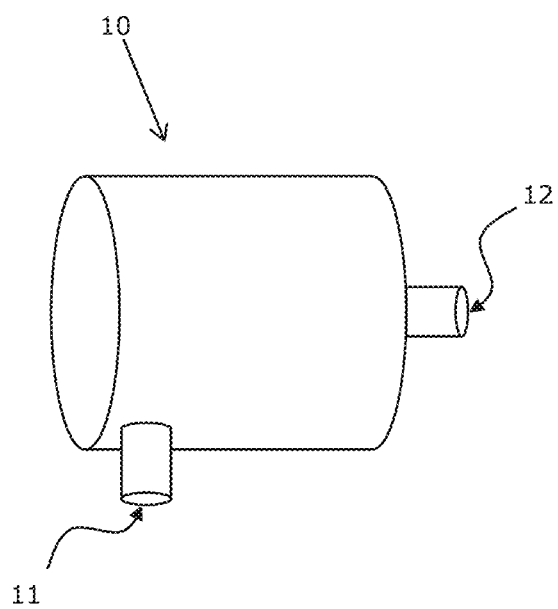
FIG. 6 shows an external view of a macerator with a horizontal outlet.
Figure 7:
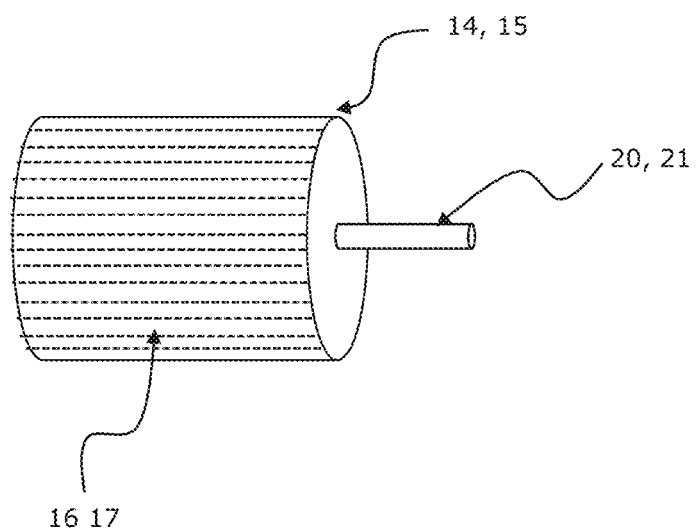
FIG. 7 shows a cylindrical body of a macerator.

In an alternate embodiment as shown in FIG. 4 the leading edge of the elongate sections of the body are positioned at an angle to the notional circumference of the rotational axis of the body. Preferably the leading edge is positioned at an angle of about 5, 10, 15, 20, 25 or 30 degrees relative to the notional circumference of the rotational axis of the body, and suitable ranges may be selected from between any of these values, (for example, about 5 to about 30, about 5 to about 25, about 5 to about 20, about 5 to about 15, about 10 to about 40, about 10 to about 20, about 10 to about 15, about 15 to about 30, about 15 to about 25 or about 20 to about 30 degrees).

Each body (inner body 14 and the outer body 15) may have at least one or a plurality of apertures 16. The apertures 16 extend through the respective body. The apertures 16 define a flow path through each body.

The inlet slurry may traverse the flow path from the macerator inlet 17 to the macerator outlet 18 via the at least one aperture 16 of each body to produce an outlet slurry.

In some embodiments, the macerator 10 may comprise one or more inlets 11. The macerator inlets 11 may be spaced equidistantly about the macerator housing 16. The inlet slurry may be provided at pressure to the inlet of the macerator. In some embodiments the rotation of the bodies is configured to draw in said inlet slurry.

Each successive concentric body of the macerator 10 are separated from each other by less than about 0.1, 0.2, 0.3, 0.4, 0.5, 0.6, 0.7, 0.8, 0.9 or 1.0 mm, and suitable ranges may be selected from between any of these values, (for example, about 0.1 to about 1.0, about 0.1 to about 0.8, about 0.1 to about 0.5, about 0.2 to about 1.0, about 0.2 to about 0.9, about 0.2 to about 0.7, about 0.2 to about 0.5, about 0.3 to about 1.0, about 0.3 to about 0.7, about 0.3 to about 0.5, about 0.4 to about 1.0, about 0.3 to about 0.8, about 0.4 to about 1.0, about 0.4 to about 0.7, about 0.5 to about 1.0, about 0.5 to about 0.8, about 0.6 to about 1.0, about 0.6 to about 0.9, about 0.7 to about 1.0, about 0.7 to about 0.9 or about 0.8 to about 1.0 mm.

The rotation of the inner 14 body relative to the outer 15 body applies a shear stress to the plastic particles as they pass through the apertures 16 of the outer body 15 through the intermediate space between the outer body 15 and the inner body 14 and through the apertures 16 of the inner body 14, to the outlet.

In relation to the inlet particle size it will be appreciated that the dimensions of the slot or aperture will be dependent on the inlet particle size for that particular body. For example, as mentioned the particle must be sized to be able to enter through the slot or aperture. If the particle is larger than the slot or aperture then it will not be able to enter the slot or aperture and be cut. Additionally, consideration must be had of the velocity of relative rotation of adjacent bodies. That is, the time at which the slots or apertures in successive bodies line up and then close is called the time to closure. For example, at some point the slot or aperture of adjacent bodies will line up and then the gradually close as the bodies rotate relative to each other. Thus the slot or aperture 16 must be larger than the size of the particle to provide additional slot or aperture width for the particle to traverse. The rate of closure will increase as the relative rotational speed of adjacent bodies increased.

In one embodiment the slot or aperture width is at least 3.5, 4.0, 4.5, 5.0, 5.5, 6.0, 6.5, 7.0, 7.5, 8.0, 8.5× the average particle size of the plastic particles traversing that slot or aperture, and suitable ranges may be selected from between any of these values, (for example, about 3.5 to about 8.5, about 3.5 to about 7.5, about 3.5 to about 6.0, about 3.5 to about 5, about 4.0 to about 8.5, about 4.0 to about 8.0, about 4.0 to about 7.0, about 4.0 to about 6.5, about 4.5 to about 8.5, about 4.5 to about 7.5, about 4.5 to about 5.5, about 5.0 to about 8.5, about 5.0 to about 8.0, about 5.5 to about 7.5, about 5.5 to about 6.5, about 6.0 to about 8.5, about 6.0 to about 8.0, about 6.5 to about 7.5× the average particle size of the plastic particles traversing that slot or aperture).

FIG. 1 shows apertures 16 in the inner body 14 however apertures 16 are not shown in the outer body 15 for simplicity.

In some embodiments, the apertures 16 of the inner body 14 may be approximately half the size of the apertures 16 of the outer body 15, or the apertures 16 of the outer body 15 are approximately twice the size of the apertures 16 of the inner body 14. The reason for this is that as the plastic particles traverse the outer bodies they are cut to a smaller size, and thus the next bodies' aperture size can be decreased.

Alternately, where there are three or more bodies 13, the rotational speed of the third body could be increased which will increase the rate of closure of the second body relative to the third body, but due to the smaller particle size the particles will still traverse through the aperture or slot.

Thus in one embodiment the slot or aperture width of successive bodies decreases. Alternately, the rotational speed of successive bodies increases to increase the rate of closure. Alternately, a combination of the two could be done. That is increasing the rate of rotation of successive bodies while also decreasing width of the slot or aperture.

In some embodiments, the outlet 12 of the macerator is provided internal to the inner body 14, and the inlet 11 is provided external to the outer body 15.

The macerator 10 may comprise a housing to house the bodies 13. In some embodiments, a motor may be coupled or connected to said housing so as to rotate the inner body 14 relative to the outer body 15.

The outlet slurry from the macerator 10 may have a plastic particle size being less than a predetermined plastic particle size. In some embodiments, the predetermined particle size is less than about 20, 19, 18, 17, 16, 15, 14, 13, 12, 11, 10, 9, 8, 7, 6, 5, 4, 3, 2, 1, or 0.5 μm, and suitable ranges may be selected from between any of these values.

The apertures 16 may be or comprise one or more slots or apertures 17. The slots or apertures 17 may be located vertically, and/or in a direction from the top of the body to the bottom of the body. The slots or apertures 17 may be oriented in a direction along or parallel with an axis of rotation or the body. In some embodiments, the slots or apertures 17 may be oriented in a direction with respect to a length of the body.

Figure 21:
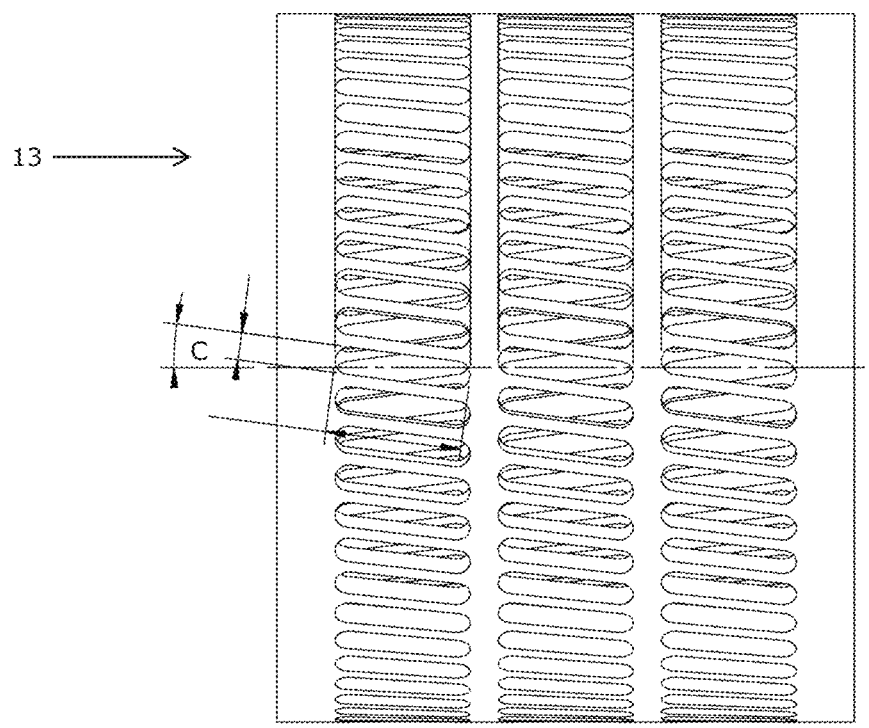
FIG. 21 shows a side view of a body with three banks of slots or apertures.

As shown in FIGS. 4, and 20 to 22, in some embodiments, the slots or apertures 17 may be angled with respect to a vertical or axial axis ("C" of FIGS. 4 and 19), or an axis of rotation of the body, or an axis parallel to a vertical or axial axis, or an axis of rotation of the body. In some embodiments, the slots or apertures 17 may be angled with respect to a length of the body. As shown in FIGS. 4 and 21 the slots or apertures are angled relative to a vertical or horizontal axis (i.e. whichever is the axis of rotation which depends on the orientation of the macerator). In one embodiment the slots or aperture are angled 3, 4, 5, 6, 7, 8, 9, 10, 11, 12, 13, 14, 15, 16, 17, 18, 19 or 20% from the axis of rotation, and suitable ranges may be selected from between any of these values, (for example, about 3 to about 15, about 3 to about 12, about 3 to about 11, about 3 to about 10, about 3 to about 9, about 3 to about 8, about 3 to about 7, about 3 to about 6, about 4 to about 15, about 4 to about 13, about 4 to about 10, about 4 to about 8, about 4 to about 7, about 4 to about 6, about 5 to about 15, about 5 to about 12, about 5 to about 10, about 5 to about 9, about 5 to about 8, about 5 to about 7, about 5 to about 6, about 6 to about 15, about 6 to about 14, about 6 to about 11, about 6 to about 9, about 6 to about 8, about 7 to about 15, about 7 to about 14, about 7 to about 13, about 7 to about 10, about 7 to about 8, about 8 to about 15, about 8 to about 10, about 9 to about 15, about 9 to about 13% from the axis of rotation).

In one embodiment the slots or apertures or successive bodies are angled oppositely to each other. For example, where an outer body has the slots or apertures angled +7.5% relative to the axis of rotation, the next body has the slots or apertures angled −7.5% relative to the axis of rotation. Thus, the relative angle of the slots or apertures to each other is doubled in this instance to 15°. It will be appreciated that each body can have the slots angled at any angle as mentioned above between 3 and 15 but in this instance each successive body has them angled oppositely relative to the axis of rotation so that the angle of the slots of adjacent bodies is the cumulative angle of both bodies.

Figure 22:
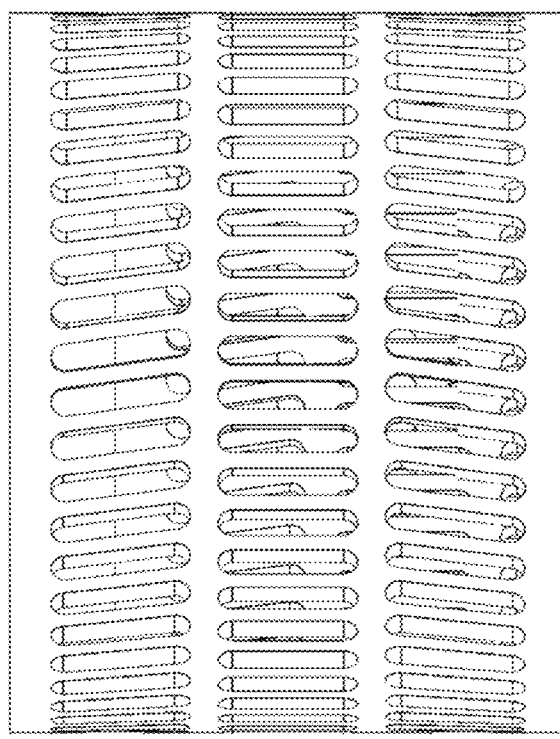
FIG. 22 shows a side view of a body with three banks of slots or apertures.

As shown in FIG. 22, the maceration body may comprises slots or apertures with a range of orientations. The body may comprise at least three bands of apertures or slots, with at least one of the slots oriented horizontally relative to the rotational axis, and the other two bands of slots angled oppositely to each other relative to the horizontal axis.

In some embodiments, the slots of the outer body are wider than the slots of the inner body. For example, the slots of the outer body may be about 1.5 to about 2.5 times wider than the slots of the inner body. As a further example, the slots of the outer body may be about 2 times wider than the slots of the inner body.

In some embodiments, at least one slot of the outer body comprises a projection from the outer surface of the outer body. This projection may comprise a blade.

The projection from the outer surface of the outer body preferably extends in the direction of rotation of the outer body at an acute angle relative to the outer surface of the outer body. For example, the projection may extend at an angle of about 5, 10, 15, 20, 25 or 30 degrees. As a further example, the projection may extend at an angle of about 15 degrees.

In some embodiments a width of the one or more slots 17 is substantially constant along a length of the slot 17. In some embodiments the width of the slots 17 varies along a length of the slot 17.

The slots 17 may vary in width from an outer surface of the body to an inner surface of the body. The slots 17 may taper in width from an outer surface of the body to an inner surface of the body, or from an inner surface of the body to an outer surface of the body.

The slot at an outer surface may be greater than a width of the slot at an inner surface. The width of the slot at an inner surface is greater than a width of the slot at an outer surface.

The width of the one or more aperture or slots 17 are 1, 2, 3, 4, 5, 6, 7, 8, 9, 10, 11, 12, 13, 14 or 15 mm, and suitable ranges may be selected from between any of these values (for example, 1 to about 15, about 1 to about 12, about 1 to about 10, about 1 to about 8, about 2 to about 15, about 2 to about 13, about 2 to about 11, about 2 to about 9, about 2 to about 7, about 3 to about 15, about 3 to about 14, about 3 to about 10, about 3 to about 8, about 4 to about 15, about 4 to about 13, about 4 to about 11, about 4 to about 10, about 407, about 5 to about 15, about 5 to about 14, about 5 to about 12, about 5 to about 10, about 5 to about 8, about 6 to about 15, about 6 to about 13, about 6 to about 12, about 6 to about 8, about 7 to about 15, about 7 to about 14, about 7 to about 11, about 7 to about 9, about 8 to about 15, about 8 to about 14, about 8 to about 11, about 9 to about 15, about 9 to about 13, about 9 to about 11, about 10 to about 15, about 10 to about 13, about 11 to about 15, about 11 to about 14 or about 12 to about 15 mm).

The width of the one or more slots 17 may be between about 1 and about 15 mm, or about 1 mm, or about 3 mm, or about 4 mm, or about 5 mm, or about 6 mm, or about 7 mm, or about 8 mm, or about 9 mm, or about 10 mm, or about 11 mm or about 12 mm, about 13 mm, or about 14 mm, or about 15 mm, or about 16 mm, or about 17 mm, or about 18 mm, or about 19 mm, or about 20 mm.

In one embodiment there is located, between the slots on the outer surface of the body, one or more grooves or indentations. The grooves or indentations provide another cutting surface, notwithstanding that they do not penetrate fully through the thickness of the body. The grooves or indentations may run substantially parallel to the aperture or slots. The grooves or indentations may run a length substantially equal to the length of the major axis of the aperture or slots.

The inner body 14 may be rotatable about an axial axis, and the outer body 15 may be stationary.

Alternatively, the outer body 15 may be rotatable about an axial axis, and the inner body 14 is stationary.

In some embodiments the inlet body configured to provide for an inlet flow path for the pair of bodies, may be stationary, and the outlet body configured to provide for an outlet flow path for the pair of bodies may be rotating.

One or more of the inner body 14 and the outer body 15 are rotatable about an axial axis.

The macerator 10 may comprise an inner body shaft 20. The inner body shaft 20 may be coupled to the inner body 14 and/or one or more inner bodies to allow for rotation of the inner body 14 and/or one or more inner bodies relative to an axial axis of the inner body and/or one or more inner bodies. In some embodiments, the inner body shaft 20 is provided with a pair of high speed water cooled bearings to allow for rotation of the inner body shaft 20.

In one embodiment each of the bodies of the macerator 10 are on a common shaft. In one embodiment the bodies are connected to a shaft, with each bodies shaft being located within another shaft. Preferably the macerator comprises a gear box that allows for one or more bodies of the macerator to have a direction of rotation different to one or more of other bodies of the macerator 10.

The macerator 10 may comprise an outer body shaft 21. The outer body shaft 21 may be configured to be coupled to the outer body 21 and/or one or more outer body to allow for rotation of the outer body 15 and/or one or more outer body relative to an axial axis of the outer body 15 and/or one or more outer body. In some embodiments, the outer body shaft 21 is provided with a pair of high speed water cooled bearings to allow for rotation of the inner body shaft 20.

The inner body shaft 20 and/or the outer body shaft 21 may be coupled to at least one motor 22. The at least one motor 22 may be configured to rotate the inner body shaft 20 and/or the outer body shaft 21.

The macerator 10 may include a liquid cooled bearing (not shown) on the body shaft. The advantage of this design is that the slurry liquid is used to cool the bearing, which would otherwise operate at high temperatures due to the heat produced by the maceration of the plastic.

The inner body 14 or the outer body 15 may be an inlet body configured to provide for an inlet flow path for the pair of bodies. The other of the inner body 14 or the outer body 15 may be an outlet body configured to provide for an outlet flow path for the pair of bodies.

A width or other dimension, or largest dimension of the at least one aperture 16 of the inlet body 14 may be greater than a width or other dimension, or largest dimension of the at least one aperture 16 of the outlet body 15.

The macerator 10 may comprise a plurality of pairs of bodies. Each pair of bodies may be located concentrically with respect to each other pair of bodies.

The macerator 10 may comprise at least a first pair of bodies, and a second pair or bodies. In some embodiments the macerator 10 may comprise a third pair or bodies. In some embodiments the macerator 10 may comprise one or more further pairs of bodies.

The flow path from an inlet of the macerator 10 to the outlet of the macerator 10 may be through the first pair of bodies, followed by the second pair or bodies, and optionally through the third pair or bodies, and optionally through said one or more further pairs of bodies.

The progression of the slurry through each pair of bodies is configured to progressively decrease a particle size of plastic in the slurry. The number of pairs of bodies, the size of the apertures in the each body, and the distance between the pair of bodies may be customized based on the characteristics of the inlet slurry, and the desired characteristics of the outlet slurry. In some embodiments, the surface area of the bodies may be based on the desired flow rate of inlet slurry and/or the desired outlet particle size.

The first pair of bodies 18 may comprises an inlet body (being one of the inner body or the outer body), and a width or other dimension, or largest dimension of the apertures of the inlet body, for example, may be about 20 mm.

The first pair of bodies 18 may comprises an outlet body (being the other of the inner body and the outer body), and a width or other dimension, or largest dimension of the apertures of the outlet body, for example, may be about 17 mm.

The second pair of bodies 19 may comprise an inlet body (being one of the inner body or the outer body) wherein a width or other dimension, or largest dimension of the apertures of the inlet body, for example, may be about 17 mm.

The second pair of bodies 19 may comprise an outlet body (being the other of the inner body and the outer body) wherein a width or other dimension, or largest dimension of the apertures of the outlet body, for example, may be about 12 mm.

The third pair of bodies may comprise an inlet body (being one of the inner body or the outer body) wherein a width or other dimension, or largest dimension of the apertures of the inlet body, for example, may be about 12 mm.

The third pair of bodies may comprise an outlet body (being the other of the inner body and the outer body) wherein a width or other dimension, or largest dimension of the apertures of the outlet body, for example, may be about 3 mm.

The flow path from the macerator inlet to the macerator outlet may be provided through the apertures of each body of each pair of bodies.

The flow path from the macerator inlet to the macerator outlet may be provided from an innermost body to an outermost body via each intermediate body.

The flow path from the macerator inlet to the macerator outlet may be provided from an outermost body to an innermost body via each intermediate body.

The flow of inlet slurry may be provided to internal surface of the inner body 14 and/or an internal surface of the inner body 14 of the innermost pair of bodies. For example where the inner body 14 of the innermost pair of bodies acts as an inlet body.

The flow of inlet slurry may be provided to external surface of the outer body 15 and/or an external surface of the outer body 15 of the outermost pair of bodies. For example where the outer body 15 of the outermost pair of bodies acts as an inlet body.

In one embodiment the flow of slurry may be across the macerator as shown in FIG. 1B. For example, the inlet may be to the bottom of the macerator as shown in FIG. 1B and then flows through the macerator and outlets the top of the macerator. That is, the slurry goes through each layer of body to the center of the macerator and then traverses each layer of the bodies to outlet the macerator.

Therefore, for a macerator with a pair of bodies, the slurry will traverse two pairs of slots or apertures between the inlet and the outlet. With a macerator having three bodies, the slurry will traverse six slots or apertures, three on the bottom of the macerator and then three on the way to the outlet from the center of the macerator. It will be appreciate that the macerator will include baffles or blockages to prevent the slurry from going around the side of the bodies. That is, the macerator will include one or more flow guides that direct the slurry though the slot or apertures of the macerator. In this embodiment the fact that plastic floats is useful as it assist s the plastic from moving through the macerator from the bottom to the top across the bodies. Combined with inletting the slurry at pressure assists movement of the particles across the macerator.

In one embodiment the inlet of slurry to the macerator is substantially spread along the length of the macerator. Preferably the inlet comprises a manifold.

In some embodiments the inlet body is stationary, and the outlet body rotates relative to the inlet body.

The inlet slurry may comprises plastic particles having a particle size of 4 mm to 20 mm, and optionally around 8 mm.

The outlet slurry may comprise plastic particles having a particle size of 0.5 μm to 20 μm.

The outlet slurry (after passing through the macerator 10) may comprise plastic particles having a plastic particle size. The plastic particle size is less than a predetermined plastic particle size.

In some embodiments, the predetermined plastic particle size is less than 0.5, 1, 2, 3, 4, 5, 6, 7, 8, 9, 10, 11, 12, 13, 14, 15, 16, 17, 18, 19 or 20 μm.

In some embodiments, if the plastic particle size is greater than the predetermined plastic particle size the outlet slurry may be directed to the macerator inlet 11 (for example cycled through the macerator 10 again), and/or to another macerator inlet 11 (for example to a further macerator inlet 11 of another macerator 10) until the outlet slurry has a particle size being less than the predetermined particle size.

In some embodiments the flow rate of inlet slurry provided to the macerator 10 may be based on one or more of: the plastic type and its particular characteristics for example the plastic melting point, the size of the apertures in the bodies, the overall surface are of the bodies, or the ratio of liquid to plastic in the slurry.

Also disclosed is a system 50 for processing plastic. The system may comprise an inlet configured to receive a system inlet slurry comprising plastic particles, and an outlet configured to deliver a system outlet slurry. The system may also comprise a maceration stage 51. The maceration stage 50 decreases the particle size of the plastic particles within the slurry, as the slurry passes through the maceration stage 51. The maceration stage 51 may comprise one or more macerator 10, as described above. The system inlet slurry may be provided to the maceration stage 51 so as to produce the system outlet slurry.

The system may comprise a plurality of macerators. At least two of the plurality of macerators may be arranged in series. Alternatively or additionally, at least two of the plurality of macerators may be arranged in parallel.

The outlet slurry of one of the one or more macerators 10 may be configured to be directed to the inlet of another of the one or more macerators, and/or to the inlet of the same macerator 10.

The system 50 may comprise at least a first macerator 52, and a second macerator 53, optionally the system comprises a third macerator 54, and optionally one or more further macerators 55.

One or more filter elements may be located between the output of one macerator and the input of another macerator. The one or more filter elements may filter out or prevent the passing of particles above a certain particle size. The one or more filter elements may be configured to ensure particles which are too large for the subsequent macerator (for example particles which might cause the macerator to become clogged) are not provided to the subsequent or next macerator.

A flow path may be provided from the inlet of the system to the outlet of the system via the first macerator 52, followed by the second macerator 53, and optionally followed by the third macerator 54, and optionally followed by one or more further macerators 55.

The first macerator 52 may comprise an inlet body (being one of the inner body 14 or the outer body 15). A width or other dimension, or largest dimension of the apertures 16 of the inlet body is about 20 mm, and an outlet body (being the other of the inner body and the outer body) wherein a width or other dimension, or largest dimension of the apertures of the outlet body is about 17 mm.

The second macerator 53 may comprise an inlet body (being one of the inner body or the outer body). A width or other dimension, or largest dimension of the apertures of the inlet body is about 17 mm, and an outlet body (being the other of the inner body and the outer body) wherein a width or other dimension, or largest dimension of the apertures of the outlet body is about 12 mm.

The third macerator 54 may comprise an inlet body (being one of the inner body or the outer body). A width or other dimension, or largest dimension of the apertures of the inlet body is about 12 mm, and an outlet body (being the other of the inner body and the outer body) wherein a width or other dimension, or largest dimension of the apertures of the outlet body is about 3 mm.

The system outlet slurry may comprise plastic particles having a plastic particle size. In some embodiments the plastic particle size is less than a predetermined plastic particle size.

The predetermined plastic particle size may be less than 0.5, 1, 2, 3, 4, 5, 6, 7, 8, 9, 10, 11, 12, 13, 14, 15, 16, 17, 18, 19 or 20 μm, and suitable ranges may be selected from between any of these values.

In some embodiments, if the plastic particle size is greater than the predetermined plastic particle size the outlet slurry of one of the plurality of macerators is directed to the macerator inlet (for example being cycled back into the same macerator), and/or to another macerator inlet (for example of another macerator 10 of the plurality of macerators) until the outlet slurry has a particle size of less than the predetermined particle size.

The inlet slurry may be recycled through the maceration stage 51 until the outlet slurry has a particle size of less than the predetermined particle size.

The time to pass through the macerator may be controlled by modifying the speed of relative rotation between the inner body and the outer body, and/or the spacing between the inner body and the outer body, and/or the flow rate of the slurry, and/or the particle sizes of the particles in the slurry.

In some embodiments, the flow rate of the solvent through the macerator 10 may be about 10 liters per minute to about 1000 liters per minute. In particular, the flow rate of the solvent through the macerator 10 may be approximately 100 liters per minute.

In some embodiments, the ratio of carrier solvent such as water to plastic provided to the macerator is at a ratio of approximately 1 liter to 0.5 kg, to approximately 1 liter to 1.5 kg.

In some embodiments, the ratio of carrier solvent such as water to plastic provided to the macerator is at a ratio of approximately 1 liter to 1 kg.

The system may further comprise a refining stage 70. The refining stage 70 may comprise at least one refiner. The refining stage 70 may be located after the maceration stage 51 to receive the macerated slurry from the maceration stage 51. In some embodiments, where there are enough macerators 10 in the maceration stage 50 the refining stage 70 may be omitted.

The refiner may comprise an inner sheath 71. The inner sheath 71 having a plurality of apertures 72. The polished may further comprise an outer sheath 73 about one side or surface of the inner sheath to define an inlet between the inner and outer sheaths, and an outlet on the other side of the inner sheath to define a flow path from the inlet via the apertures to the outlet.

The inner sheath 71 and outer sheath 72 may be conical or frusto-conical.

The inner sheath 71 may be a substantially continuous surface.

The outer sheath 72 may be or comprise a mesh or grid-type material. The apertures 72 may be provided by the mesh material.

The inner sheath 71 may be or comprise a mesh or grid-type material, and the outer sheath 72 may be a substantially continuous surface.

In some embodiments the spacing between the inner sheath 71 and outer sheath 72 is substantially constant.

In some embodiments the spacing between the inner sheath 71 and outer sheath 72 is less than 10 mm. In some embodiments the spacing between the inner sheath 71 and outer sheath 72 is less than 5 mm, or less than 4 mm, or less than 3 mm.

In some embodiments the spacing between the inner sheath 71 and outer sheath 72 is about 1 mm to about 2 mm.

The use of the process preferably produces particles having a mean particle size of less than 20, 19, 18, 17, 16, 15, 14, 13, 12, 11, 10, 9, 8, 7, 6, 5, 4, 3, 2, 1, 0.5 µm, and suitable ranges may be selected from between any of these values (for example, 1 to about 20, about 1 to about 19, about 1 to about 15, about 1 to about 10, about 1 to about 5, about 2 to about 20, about 2 to about 19, about 2 to about 14, about 2 to about 10, about 2 to about 8, about 2 to about 4, about 3 to about 20, about 3 to about 17, about 3 to about 15, about 3 to about 11, about 3 to about 7, about 3 to about 5, about 4 to about 20, about 4 to about 16, about 4 to about 12, about 4 to about 10, about 4 to about 8, about 4 to about 6, about 5 to about 20, about 5 to about 17, about 5 to about 13, about 5 to about 10, about 5 to about 7, about 6 to about 20, about 6 to about 18, about 6 to about 14, about 6 to about 11, about 6 to about 8, about 7 to about 20, about 7 to about 13, about 7 to about 10, about 8 to about 20, about 8 to about 18, about 8 to about 15, about 8 to about 10, about 9 to about 20, about 9 to about 16, about 9 to about 11, about 10 to about 20, about 10 to about 18, about 10 to about 15, about 10 to about 14, about 11 to about 20, about 11 to about 18, about 11 to about 14, about 12 to about 20, about 12 to about 18, about 12 to about 15, about 13 to about 20, about 13 to about 17, about 13 to about 15, about 14 to about 20, about 14 to about 16, about 15 to about 20 µm).

The process comprises providing to a macerator plastic particles having a particle size of less than 0.5, 1.0, 1.5, 2.0, 2.5, 3.0, 3.5 or 4.0 mm, whereby the macerator(s) processes the plastic particles to a particle size of less than 0.5, 1, 2, 3, 4, 5, 6, 7, 8, 9, 10, 11, 12, 13, 14, 15, 16, 17, 18, 19 or 20 µm (optionally being the predetermined particle size).

In some embodiments the process includes the in-line use of an agitator as described that reduces the waste plastic to the particle size of 0.5, 1.0, 1.5, 2.0, 2.5, 3.0, or 4.0 mm.

In some embodiments the process includes the in-line use of a coarse processing unit, such as a cutting and/or extruders, shredders, granulators or grinder that reduces the plastic to a particle size of about 5, 6, 7, 8, 9, 10, 11, 12, 13, 14, 15, 16, 17, 18, 19 or 20 mm.

In some embodiments the process for processing the plastic comprises providing a macerator and optionally providing a refiner, the macerator having an inlet and an outlet, the macerator comprising one or more pairs of bodies, the pair of bodies comprising an inner body and an outer body that rotate relative to each other, the inner and outer bodies being separated from each other by less than 1.2 mm, and each body comprising a plurality of apertures to define a flow path through each body, if present, the refiner comprising an inner sheath, having a plurality of apertures, and an outer sheath about one side of the inner sheath to define an inlet between the inner and outer sheaths, and an outlet on the other side of the inner sheath to define a flow path from the inlet via the apertures to the outlet, introducing a slurry to the macerator inlet, the slurry comprising plastic particles having a particle size of 4 mm to 20 mm, wherein the slurry traverses the flow path from the macerator inlet to the macerator outlet via the apertures of each body to produce a slurry having a plastic particle size, such that if the particle is greater than 0.5 µm, or 1 µm or a predetermined particle size the slurry is directed to the macerator inlet or a macerator inlet of another macerator until the outlet slurry has a particle size of less than 0.5 µm, or 1 µm, or a predetermined particle size introduced to the refiner inlet to traverse the flow path via the inner sheath aperture to the refiner outlet, to produce a plastic having a particle size less than 0.5 µm, or 1 µm, or a predetermined particle size a combination of (i) and (ii); such that the method of processing plastic produces a slurry comprising plastic having a particle size less 0.5 µm, or 1 µm, or a predetermined particle size.

In some embodiments, if the particle is greater than 0.5 µm, or 1 µm, or a predetermined particle size the slurry is directed to the macerator inlet or a macerator inlet of another macerator until the system outlet slurry has a particle size of less than a predetermined plastic particle size, or introduced to the refiner inlet to traverse the flow path via the inner sheath aperture to the refiner outlet, to produce a plastic having a particle size less than a predetermined plastic particle size, or a combination of (i) and (ii).

In some embodiments the system 50 further comprises an emulsification stage, optionally the emulsification stage located subsequent to the refining and maceration stages.

The emulsification stage may be configured to generate a substantially homogeneous slurry.

One or more additives may be provided to the emulsification stage to increase or decrease the viscosity of the slurry. The one or more additives may include cornflour.

In some embodiments the system further comprises a water cooling system configured to cool the macerator, and emulsion units, optionally cooling any bearings.

The outer body preferably rotates relative to the inner body on an outer body rotational axis. The inner body also preferably rotates relative the outer body on an inner body rotational axis.

In some embodiments, either or preferably both of the outer body and inner body comprise a body having a substantially circular cross section, when the cross-section is take along the respective rotational axis of the inner body and outer body.

n some embodiments, the rotational axes of the inner body and outer body are aligned so that the inner body and outer body are concentric with each other.

In some embodiments, either or preferably both of the inner body and outer body may either comprise cylindrical bodies, frusto-conical bodies, or conical bodies. An example of a macerator comprising cylindrical bodies is seen for example in FIG. 1.

Figure 10:
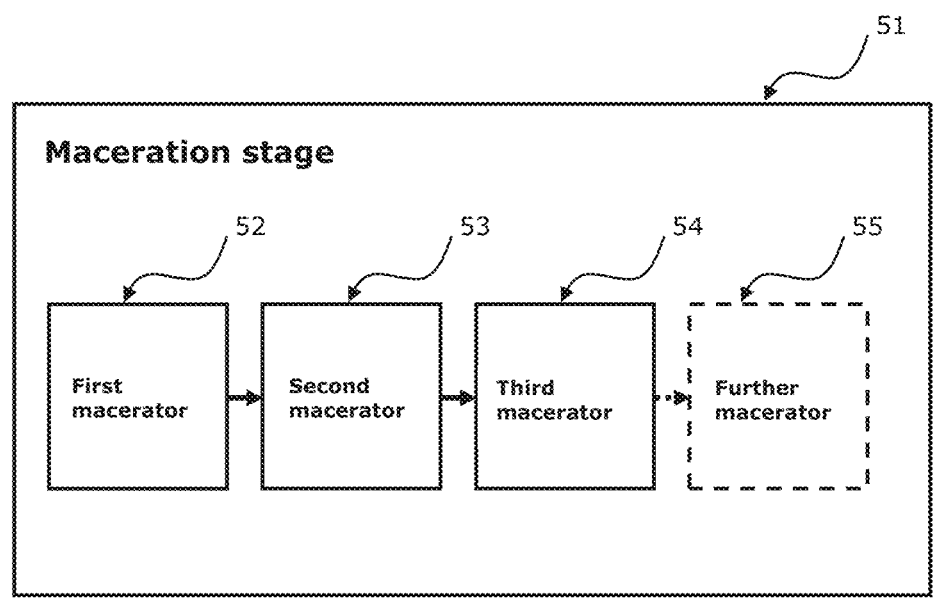
FIG. 10 shows a maceration stage having a plurality of macerators.

An example of a macerator having an inner conical body 114 and an outer conical body 115 is seen in FIG. 10. An example view of a macerator having an inner frusto-conical body 214 and an outer frusto-conical body 215 is seen in FIG. 11.

The section views of FIGS. 10 and 11 are taken along a rotational axis of the inner body and outer body. In FIG. 10 the input material is shown passing into the inner cone 114, through the apertures of each of the inner cone and the outer cone, and finally from the outside of the outer cone 115 as an outlet slurry. In alternative forms the flow through the macerator of FIG. 10 may be reversed, such that the input flow passes through the outer cone first, then through the inner cone, and exits from the inside of the inner cone as an outlet slurry.

An example of such a configuration is seen in frusto-conical macerator of FIG. 11. As seen in FIG. 11, the inlet slurry passes first through the apertures of the outer frusto-conical body 214, then through the apertures of the inner frusto-conical body 215, to exit as outlet slurry from the inner frusto-conical body.

The process produces plastic have a particle size less than 0.5, 1, 2, 3, 4, 5, 6, 7, 8, 9, 10, 11, 12, 13, 14, 15, 16, 17, 18, 19 or 20 μm, and suitable ranges may be selected from between any of these values.

In some embodiments the plastic particles have a size distribution whereby at least 90, 91, 92, 93, 94 or 95% of the plastic particles have a mean particle diameter of 0.5, 1, 2, 3, 4, 5, 6, 7, 8, 9, 10, 11, 12, 13, 14, 15, 16, 17, 18, 19 or 20 μm.

In various embodiments, the plastic particles of the present invention have a particle size distribution whereby at least 90% of the granules have a diameter of 0.5, 1, 2, 3, 4, 5, 6, 7, 8, 9 or 10 μm. In one embodiment, the invention relates to a population of plastic particles wherein at least 90% of the granules have a diameter within 1 μm of the mean diameter of the population.

The plastic particles of the process of the invention can be used in a range of products such as concrete products (e.g. pre-cast concrete or concrete blocks), wood-containing products (e.g. composite boards, plywood and laminated veneer lumber, and reconstituted wood products such as particle board, oriented strand board and the like), reconstituted plastic products, and roading material.

In one embodiment the invention provides for the production of a base ingredient as an emulsion, for use in the production of a composite plastic product, the base ingredient comprising a first component, being a slurry comprising plastic particles having a mean particle diameter of less than 0.5, 1, 2, 3, 4, 5, 6, 7, 8, 9, 10, 11, 12, 13, 14, 15, 16, 17, 18, 19 or 20 μm, the plastic particles in the first component comprising 50 to 80% polyethylene and 20 to 50% of other plastics; a second component comprising at least 40% of a paper and a substrate, the substrate selected from wood, rubber, concrete or a combination thereof; wherein the first and second components are mixed to produce an emulsion.

EXAMPLE

Example 1—Wood Board

TABLE 1

| Component | Weight (kg) |
| --- | --- |
| Wood chip (optionally, long strand between about 10 mm and 100 mm) | 0.65 |
| Saw dust | 1.5 |
| High-density polyethylene (HDPE) Powder | 1.5 |
| Cross linker (optionally an organic peroxide, optionally Luperox) | 0.2 |

The components may be mixed and press formed at a force of between about 100 tonnes and 200 tonnes, at a temperature of between about 180° C. and about 200° C.

The components may comprise approximately 95% waste plastic.

Example 2—Impact Board

TABLE 2

| Component | Weight (kg) |
| --- | --- |
| Paper Fine Grind (approximately 1 mm) | 0.8 |
| IBC Grinds (from macerator) | 1.0 |
| IBC Crum (optionally about 8 mm) | 1.7 |
| High-density polyethylene (HDPE) Powder | 0.5 |

The components may be mixed and press formed at a force of between about 100 tonnes and 200 tonnes, at a temperature of between about 180° C. and about 200° C.

The components may comprise approximately 100% waste plastic.

Example 3—Paper Board

TABLE 3

| Component | Weight (kg) |
| --- | --- |
| Paper Fine Grind (approximately 3 mm) | 0.3 |
| IBC Grinds (from macerator) | 1.0 |
| IBC Crum (optionally about 8 mm) | 1.0 |
| High-density polyethylene (HDPE) Powder | 0.5 |
| Cross linker (optionally an organic peroxide, optionally Luperox) | 0.1 |
| MDI | 0.2 |

The components may be mixed and rolled at a pressure of around 14 tonnes.

The components may comprise approximately 100% waste plastic.

Example 4—Roading

TABLE 4

| Component | Weight (kg) |
|---|---|
| Plastic Polystyrene | 1.5 |
| Methyl Chloride | 4.0 |
| Polyols (Blended) | 0.8 |
| Coating Stones or another filling | 3.0 |
| MDI | 0.8 |

The components may comprise approximately 21% waste plastic.

I claim:

1. A macerator for processing a slurry, the macerator comprising:
   a housing that defines a chamber, an inlet, and an outlet, the inlet configured to receive a flow of slurry;
   two or more elongate concentric bodies located within the chamber to define a gap between a surface of an outer body and an inner surface of the housing, the bodies having a first end and a second end, at least one of the bodies rotatable about an axis, and each body comprising a plurality of apertures to define a flow path through each body, from the inlet of the housing to the outlet of the housing;
   a baffle or baffles that extend a width of the gap from the first end to the second end of the bodies to define a first portion that contains the inlet, and a second portion that contains the outlet, and wherein the baffle or baffles inhibit passage of slurry between the first and second portions via the gap such that the slurry is directed through the plurality of apertures of the bodies;
   a motor to drive the at least one of the bodies that is rotatable about an axis, and
   one or more injectors that inject liquid into the gap, wherein at least one of the injectors is located in the first portion.

2. The macerator of claim 1 wherein the baffles separate the chamber into first and second portions to define first and second hemispheres.

3. The macerator of claim 2, wherein a volume of the first and second hemispheres are substantially equal.

4. The macerator of claim 2, wherein the one or more injectors inject liquid proximal to the baffle.

5. The macerator of claim 2, wherein the macerator further comprises a plurality of injectors that inject water into the gap proximal and distally to the baffle.

6. The macerator of claim 2, having three or more elongate concentric bodies.

7. The macerator of claim 6 wherein the bodies are separated from each other by 0.1 to about 1.0 mm.

8. The macerator of claim 1 wherein the housing comprises an outer casing and an inner casing to define an intermediate space.

9. The macerator of claim 8, wherein the inner casing comprises a plurality of apertures having an opening size smaller than solid particles of the slurry so that the solid particles in the slurry are not able to access the intermediate space.

10. The macerator of claim 1 having three or more elongate concentric bodies.

11. A method for producing an emulsion comprising:
    introducing a slurry into a macerator inlet, the macerator comprising:
    a housing that defines a chamber an inlet, and an outlet, the inlet configured to receive a flow of slurry,
    two or more elongate concentric bodies located within the chamber to define a gap between the a surface of the an outer body and the an inner surface of the housing, the two or more elongate concentric bodies having a first end and a second end, at least one of the two or more elongate concentric bodies rotatable about an axis, and each body comprising a plurality of apertures to define a flow path through each body, from the inlet of the housing, to the outlet of the housing,
    a baffle or baffles that extend a width of the gap from the first end to the second end of the bodies to define a first portion that contains the inlet, and a second portion that contains the outlet, and wherein the baffle or baffles inhibit passage of slurry between the first and second portions via the gap such that the slurry is directed through the plurality of apertures of each body,
    a motor to drive the rotating body or bodies,
    one or more injectors that inject liquid into the gap, wherein at least one of the one or more injectors is located in the first portion; and
    operating the motor to drive one or more of the bodies such that the slurry transverses the plurality of apertures of each body to the outlet and exits the outlet as an outlet slurry, and
    wherein a particle size of the outlet slurry is less than a particle size of the inlet slurry.

12. The method of claim 11, wherein a particle size of solid particles that can exit from the outlet slurry are less than 4 mm.

13. The method of claim 11, wherein the axis comprises an axis of rotation, and wherein the axis of rotation of the elongate concentric bodies is horizontal.

14. The method of claim 11, wherein the one or more injectors assist or direct a flow of the slurry through the apertures.

15. The method of claim 11, wherein injectors inject liquid into the gap in the second portion.

16. The method of claim 11, wherein the housing comprises an outer casing and an inner casing to define an intermediate space between the inner and outer casings.

17. The method of 16, wherein a pressure in the intermediate space is at least 2.5 to 8 times a pressure of the slurry in the gap.

18. The method of claim 11, wherein a temperature of the slurry is less than 10° C. to 30° C.

19. The method of claim 11, wherein the slurry is a slurry of water and plastic particles, and wherein an average particle size of an inlet plastic particle in the slurry is less than 20 mm.

20. The method of claim 19, wherein the method reduces plastic particle size at the outlet by at least 40% to 95%.

* * * * *